US009785617B2

(12) United States Patent
Rosner et al.

(10) Patent No.: US 9,785,617 B2
(45) Date of Patent: Oct. 10, 2017

(54) EFFICIENT CREATION OF DOCUMENTS

(75) Inventors: Roger Rosner, Pittsburgh, PA (US); Richard Cave, Camas, WA (US); Chris Rudolph, Camas, WA (US); Jay Capela, Santa Cruz, CA (US)

(73) Assignee: APPLE INC., Cupertino, CA (US)

( * ) Notice: Subject to any disclaimer, the term of this patent is extended or adjusted under 35 U.S.C. 154(b) by 1142 days.

(21) Appl. No.: 13/284,851

(22) Filed: Oct. 28, 2011

(65) Prior Publication Data
US 2012/0110440 A1 May 3, 2012

Related U.S. Application Data

(62) Division of application No. 11/033,484, filed on Jan. 10, 2005, now Pat. No. 8,078,963.

(60) Provisional application No. 60/651,479, filed on Jan. 9, 2005.

(51) Int. Cl.
G06F 17/21 (2006.01)
G06F 17/24 (2006.01)

(52) U.S. Cl.
CPC ............ G06F 17/21 (2013.01); G06F 17/248 (2013.01)

(58) Field of Classification Search
CPC ............... G06F 17/2247; G06F 17/227; G06F 17/30905; G06F 17/218; G06F 17/243; G06F 17/248; G06F 17/21
USPC .................................. 715/517, 235, 223, 246
See application file for complete search history.

(56) References Cited

U.S. PATENT DOCUMENTS

| 4,723,209 | A |   | 2/1988  | Hernandez et al. |         |
|-----------|---|---|---------|------------------|---------|
| 4,939,689 | A | * | 7/1990  | Davis et al.     |         |
| 5,267,155 | A |   | 11/1993 | Buchanan et al.  |         |
| 5,337,409 | A |   | 8/1994  | Sakata           |         |
| 5,339,392 | A | * | 8/1994  | Risberg et al.   | 715/762 |
| 5,416,895 | A |   | 5/1995  | Anderson et al.  |         |
| 5,416,900 | A |   | 5/1995  | Blanchard et al. |         |
| 5,553,216 | A |   | 9/1996  | Yoshioka et al.  |         |
| 5,590,259 | A |   | 12/1996 | Anderson et al.  |         |
| 5,742,286 | A |   | 4/1998  | Kung et al.      |         |
| 5,870,552 | A | * | 2/1999  | Dozier et al.    | 709/219 |

(Continued)

OTHER PUBLICATIONS

U.S. Appl. No. 11/033,480, filed Jan. 10, 2005, Rosner, Roger, et al.
(Continued)

*Primary Examiner* — Scott Baderman
*Assistant Examiner* — Hassan Mrabi
(74) *Attorney, Agent, or Firm* — Fletcher Yoder PC

(57) ABSTRACT

Some embodiments provide a method that efficiently designs a document. The method provides the user with a selection of templates, each with a default configuration for content. The method provides the user with a selection of page designs to add to a selected template. The method adds a selected page design to a document that is based on the selected template. Some embodiments provide methods for modifying default content of template documents with default text fields. When a user selects a default text field, the method of some embodiments selects the entire default text field for editing by the user. In some embodiments, the method highlights a text field selected by the user. Also, in some embodiments, the method deletes the content of the text field when the user provides new content for the selected field. In some embodiments, the new content is text, image, or another type of content.

21 Claims, 33 Drawing Sheets

(56) References Cited

U.S. PATENT DOCUMENTS

| | | | |
|---|---|---|---|
| 5,893,914 A * | 4/1999 | Clapp | 715/205 |
| 5,903,905 A | 5/1999 | Andersen et al. | |
| 6,230,170 B1 | 5/2001 | Zellweger et al. | |
| 6,362,900 B1 | 3/2002 | Squilla et al. | |
| 6,477,575 B1 * | 11/2002 | Koeppel et al. | 709/224 |
| 6,542,163 B2 | 4/2003 | Gorbet et al. | |
| 6,601,057 B1 | 7/2003 | Underwood et al. | |
| 6,606,105 B1 | 8/2003 | Quartetti | |
| 6,684,369 B1 * | 1/2004 | Bernardo et al. | 715/205 |
| 6,697,825 B1 | 2/2004 | Underwood et al. | |
| 6,804,675 B1 * | 10/2004 | Knight et al. | 707/754 |
| 6,813,746 B1 | 11/2004 | O'Shea | |
| 6,854,087 B1 | 2/2005 | Takeo et al. | |
| 6,874,122 B1 * | 3/2005 | Bates et al. | 715/236 |
| 7,024,621 B1 | 4/2006 | Tolpin | |
| 7,194,680 B1 * | 3/2007 | Roy | G06F 17/243 |
| | | | 715/205 |
| 7,231,598 B1 * | 6/2007 | Sawicki et al. | 715/236 |
| 7,237,193 B1 | 6/2007 | Zaky et al. | |
| 7,272,815 B1 * | 9/2007 | Eldridge et al. | 717/101 |
| 7,278,115 B1 | 10/2007 | Conway et al. | |
| 7,322,007 B2 | 1/2008 | Schowtka et al. | |
| 7,356,760 B2 * | 4/2008 | Jaeger | 715/246 |
| 7,454,711 B2 * | 11/2008 | Angiulo et al. | 715/760 |
| 7,468,805 B2 | 12/2008 | Lo et al. | |
| 7,565,605 B2 * | 7/2009 | Schohn et al. | 715/249 |
| 7,584,426 B2 * | 9/2009 | Chang et al. | 715/257 |
| 7,698,631 B1 * | 4/2010 | Toebes | 715/234 |
| 7,752,566 B1 | 7/2010 | Nelson | |
| 7,823,057 B1 | 10/2010 | Schultz et al. | |
| 7,827,483 B2 | 11/2010 | Unbedacht et al. | |
| 7,885,987 B1 * | 2/2011 | Lee | 707/923 |
| 7,944,445 B1 * | 5/2011 | Schorr et al. | 345/440 |
| 8,078,963 B1 | 12/2011 | Rosner et al. | |
| 8,181,104 B1 * | 5/2012 | Helfand et al. | 715/234 |
| 8,261,310 B2 * | 9/2012 | Gupta | 725/107 |
| 8,510,668 B1 * | 8/2013 | Raskin | 715/767 |
| 8,719,703 B2 * | 5/2014 | Bier | G06F 17/24 |
| | | | 715/255 |
| 2001/0016840 A1 * | 8/2001 | Hijikata et al. | 707/1 |
| 2001/0032248 A1 | 10/2001 | Krafchin | |
| 2002/0046235 A1 | 4/2002 | Foy et al. | |
| 2002/0059327 A1 | 5/2002 | Starkey | |
| 2002/0078100 A1 | 6/2002 | Tewari | |
| 2002/0097271 A1 * | 7/2002 | Nagasawa | 345/764 |
| 2002/0129050 A1 | 9/2002 | Gryskiewicz | |
| 2003/0025733 A1 * | 2/2003 | Broker et al. | 345/765 |
| 2003/0028562 A1 | 2/2003 | Shaughnessy et al. | |
| 2003/0095135 A1 * | 5/2003 | Kaasila | G06F 3/0481 |
| | | | 345/613 |
| 2003/0172343 A1 | 9/2003 | Leymaster et al. | |
| 2003/0182402 A1 | 9/2003 | Goodman et al. | |
| 2003/0196174 A1 * | 10/2003 | Pierre Cote | G06F 3/04892 |
| | | | 715/207 |
| 2003/0233614 A1 * | 12/2003 | Mohamed | 715/501.1 |
| 2004/0006272 A1 * | 1/2004 | Vortman et al. | 600/443 |
| 2004/0015547 A1 * | 1/2004 | Griffin et al. | 709/204 |
| 2004/0015782 A1 | 1/2004 | Day et al. | |
| 2004/0046788 A1 | 3/2004 | Keane et al. | |
| 2004/0060005 A1 | 3/2004 | Vasey | |
| 2004/0080532 A1 * | 4/2004 | Cragun et al. | 345/745 |
| 2004/0098671 A1 * | 5/2004 | Graham et al. | 715/527 |
| 2004/0117732 A1 * | 6/2004 | McNeill et al. | 715/513 |
| 2004/0167989 A1 * | 8/2004 | Kline et al. | 709/245 |
| 2004/0205526 A1 * | 10/2004 | Borodovski | G06F 17/243 |
| | | | 715/224 |
| 2004/0205542 A1 * | 10/2004 | Bargeron et al. | 715/512 |
| 2004/0243551 A1 * | 12/2004 | Boone et al. | 707/3 |
| 2005/0028088 A1 | 2/2005 | Nagayama | |
| 2005/0044496 A1 * | 2/2005 | Kotler et al. | 715/538 |
| 2005/0069225 A1 * | 3/2005 | Schneider et al. | 382/305 |
| 2005/0114784 A1 * | 5/2005 | Spring et al. | 715/762 |
| 2005/0114790 A1 * | 5/2005 | Dunbar et al. | 715/785 |
| 2005/0166159 A1 | 7/2005 | Mondry et al. | |
| 2005/0195221 A1 * | 9/2005 | Berger et al. | 345/660 |
| 2005/0216886 A1 | 9/2005 | Washburn | |
| 2005/0223326 A1 * | 10/2005 | Chang et al. | 715/533 |
| 2005/0278625 A1 | 12/2005 | Wessling et al. | |
| 2006/0053364 A1 * | 3/2006 | Hollander et al. | 715/512 |
| 2006/0069987 A1 * | 3/2006 | Jones et al. | 715/520 |
| 2006/0069989 A1 * | 3/2006 | Jones et al. | 715/526 |
| 2006/0095841 A1 * | 5/2006 | Oikawa | G06F 17/27 |
| | | | 715/205 |
| 2006/0109516 A1 | 5/2006 | Catalan et al. | |
| 2006/0109517 A1 | 5/2006 | Catalan | |
| 2006/0206807 A1 | 9/2006 | Rosner et al. | |
| 2012/0110439 A1 | 5/2012 | Rosner et al. | |

OTHER PUBLICATIONS

Portions of prosecution history of U.S. Appl. No. 11/033,480, dated Apr. 12, 2012, Rosner, Roger, et al.

Portions of prosecution history of U.S. Appl. No. 11/033,484, dated Nov. 8, 2011, Rosner, Roger, et al.

Portions of prosecution history of U.S. Appl. No. 13/284,848, dated Jan. 17, 2012, Rosner, Roger, et al.

Portions of prosecution history of U.S. Appl. No. 11/329,365, dated Mar. 28, 2012, Rosner, Roger, et al.

Author Unknown, "Step by Step Microsoft Front Page Version 2002," Month Unknown, 2001, pp. 35-39, Microsoft Press, Redmond, Washington, USA.

Author Unknown, "Microsoft Word 2003," Month Unknown, 2003, Screenshots, pp. 1-3, Microsoft Corporation.

Author Unknown, "Microsoft Word 2003," Month Unknown, 2003, Screenshots, pp. 1-5, Microsoft Corporation.

Bott, Ed, et al., "Special Edition Using Microsoft Office 2003", Sep. 15, 2003, pp. 1-17, Que Publishing, Indianapolis, USA.

Bott, Ed, et al., "Special Edition Using Microsoft Office 2003", Sep. 15, 2003, 576, 931, and 964, Que Publishing, Indianapolis, USA.

Bunzel, Tom, "Sams Teach Yourself Microsoft Office PowerPoint 2003 in 24 hours," Sep. 2003, pp. 1-6.

Bunzel, Tom, "Sams Teach Yourself Microsoft Office PowerPoint 2003 in 24 hours," Sep. 2003, pp. L1 and L2.

Millhollon, Mary, et al., "Microsoft Office Word 2003 Inside Out," Nov. 5, 2003, 112 pages, Microsoft Press.

Nicotera, Stan, "Computer Terms," Sep. 18, 2000, pp. 1-4, Special Interest Video Sales Group, http://www.sivideo.com/9pcterms.htm.

\* cited by examiner

*Figure 18*

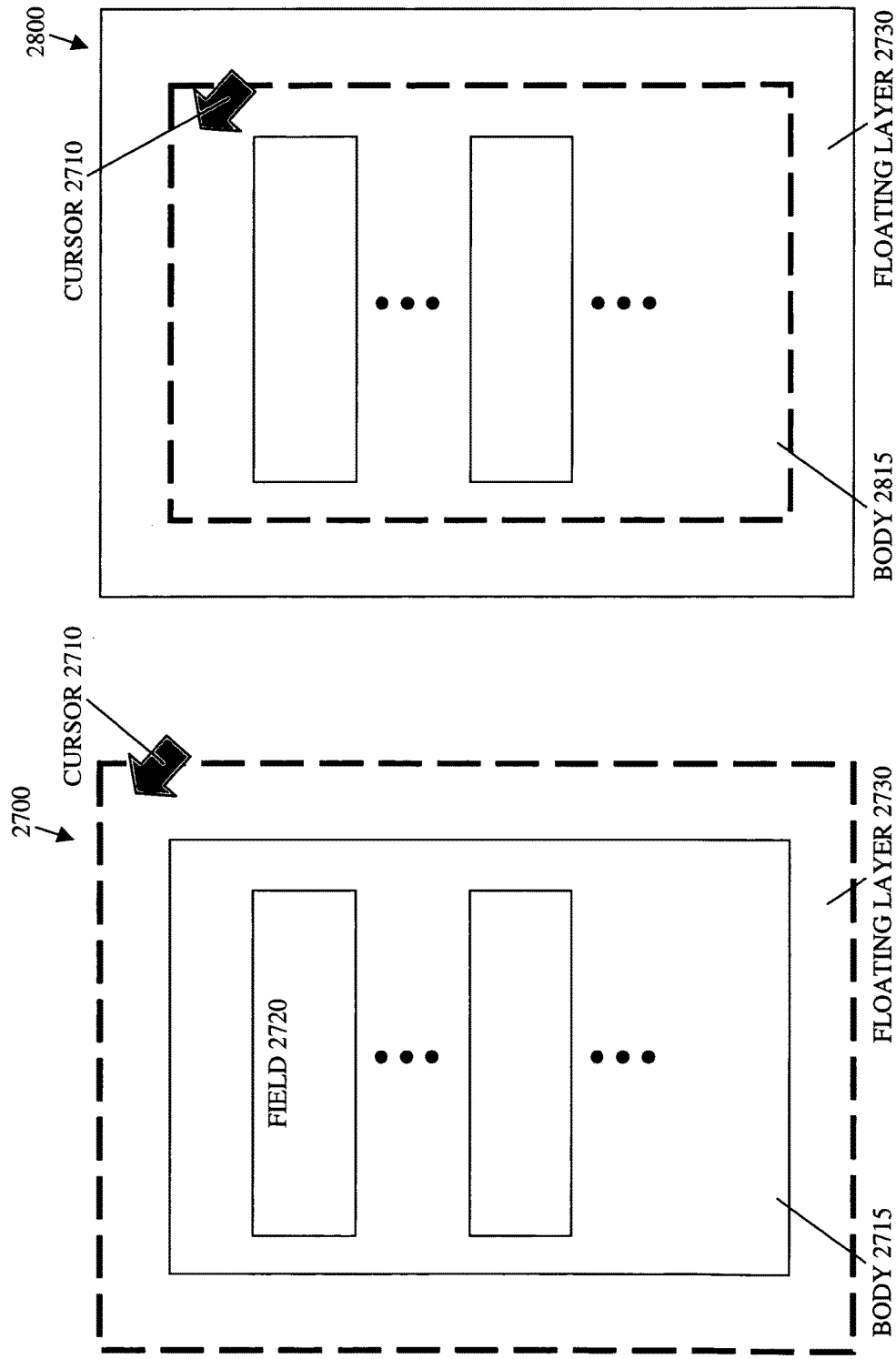

EFFICIENT CREATION OF DOCUMENTS

CLAIM OF BENEFIT TO PRIOR APPLICATIONS

This application is a divisional application of U.S. patent application Ser. No. 11/033,484, filed Jan. 10, 2005 now U.S. Pat. No. 8,078,963. U.S. patent application Ser. No. 11/033,484 claims the benefit of U.S. Provisional Patent Application 60/651,479, filed Jan. 9, 2005. U.S. patent application Ser. No. 11/033,484 is incorporated herein by reference.

FIELD OF THE INVENTION

The invention relates to efficient creation of documents.

BACKGROUND OF THE INVENTION

Among the myriad of applications available today, it is still difficult to locate a streamlined, yet powerful word processing application that gives the average user the ability to easily create well-designed documents. On a daily basis, users create documents from a simple letter or invitation to a newsletter or brochure. Users typically compose and design a variety of these documents on a computer. While computers have aided the user, computers have added complication as well with difficult to use tools and unintuitive, unimaginative interfaces. Often current applications hinder users from changing the layout and look of the documents they create because of the rigid format and structure of the templates offered to the user, or the lack of usability of the interface or application itself.

Users often have needs of presenting content in a particular format such as data by using any number of tables or charts. Current applications attempt to incorporate the more specialized content or formatted data into their documents in awkward fashion. Furthermore, current applications have lagged behind the need of users to incorporate a multitude of latest generation text and graphics types, and multimedia-based content such as movies, hyperlinks, and audio. The need and ability to publish documents online has also added new advances and challenges to the average user.

As mentioned, the templates that come with existing applications may not always fit the job. Thus, a user may be required to apply design knowledge or advanced computer skill to create user specific tools such as templates that suit the user's particular needs. However, creating such customized tools may represent a daunting task to even those well versed in the use of the application. Even to those users lucky enough to overcome the obstacles, much time will be spent both on elements of design and computer expertise by many users whose primary job function or interest is neither of these.

One obvious solution to the failings of existing applications and templates is to add more rigid, confined templates that may or may not fit the purpose and design goals of the user. Another solution is to allow the user to start from a plain document or a blank template, without pre-formatting which allows a user to build a needed template. However, building from scratch defeats the purpose of having templates. Therefore, neither of these solutions really offers a complete answer to users attempting to create a variety of documents using the latest content. An improved solution would involve both a large complement of pre-designed templates as well as the ability to further expand and configure these templates for individual tasks.

Thus, there is a need in the art for an application that is better suited to current content and needs of users. There is also a need in the art for a variety of document template types from which to choose. There is a further need in the art for the ability to expand templates. Moreover, there is a need in the art to facilitate user expansion and configuration of templates. For instance, to at least partially meet the needs mentioned above, a user should have the ability to drag or place content (e.g., imported graphics, movies, sound, text boxes, charts, tables, and shapes) onto a page of a multi-page user configurable template.

SUMMARY OF THE INVENTION

Some embodiments provide a method that efficiently designs a document. The method initially provides the user with a selection of templates, each with a default configuration for content. After the user selects a template, the method provides the user with a selection of page designs to add to the selected template. When the user selects one of the page designs, the method adds the page design to a document that it presents to the user based on the selected template.

In some embodiments, the method presents to the user a default document with a set of page designs initially when the user selects the template from the selection of templates. In some embodiments, each template has an associated set of page designs that were specifically designed a priori to match the theme of the template.

Some embodiments provide methods for modifying default content of template documents that have several default text fields. When a user selects a default text field, the method of some embodiments selects the entire default text field for immediate editing by the user. In some embodiments, the method highlights a text field selected by the user. Also, in some embodiments, the method deletes the entire default content of the text field when the user provides new content for the selected field. In some embodiments, the new content can be text, image, or other type of content.

Some embodiments define a template document in terms of several default fields for holding content. Some of these embodiments highlight the different fields on a presented template document as the user drags content over the fields. In some embodiments, several layers form the template document. Instead of, or in conjunction with the highlighting of the fields, some embodiments also highlight the different layers that form the template document as the user drags content over the document. Some embodiments also move and/or change the shape of default fields when a user adds content in the vicinity of the default fields.

BRIEF DESCRIPTION OF THE DRAWINGS

The novel features of the invention are set forth in the appended claims. However, for purpose of explanation, several embodiments of the invention are set forth in the following figures.

FIG. 18 illustrates a user replacing all the selected placeholder text by typing "HELLO WORLD!"

FIG. 27 illustrates highlighting the border of a floating layer when a cursor is over the floating layer of a document.

FIG. 28 illustrates highlighting the border of a body when a cursor is over the body of a document.

DETAILED DESCRIPTION OF THE INVENTION

Figure 1:
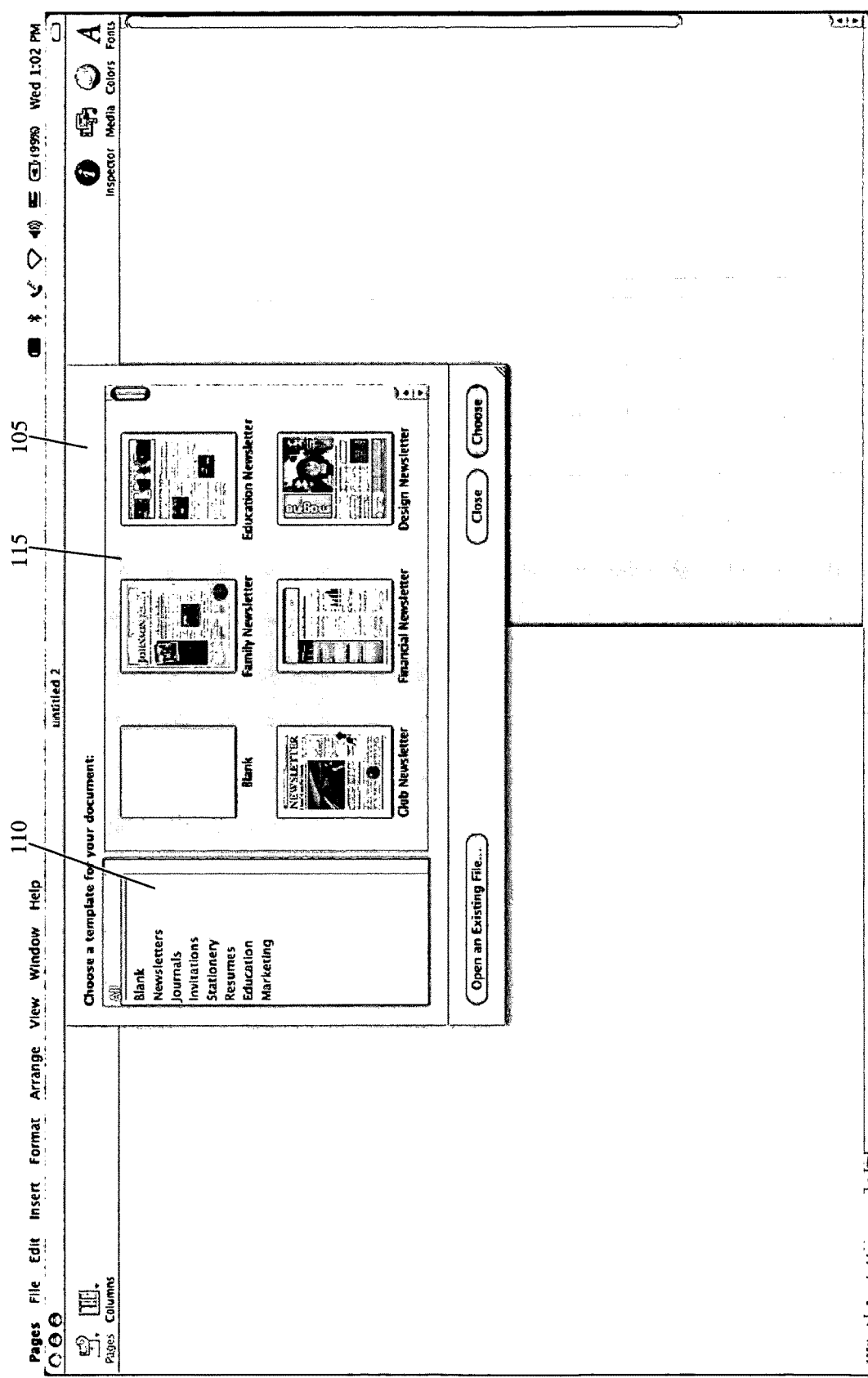
FIG. 1 illustrates several user selectable and configurable templates in a menu.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method that efficiently designs a document. The method initially provides the user with a selection of templates, each with a default configuration for content. After the user selects a template, the method provides the user with a selection of page designs to add to the selected template. When the user selects one of the page designs, the method adds the page design to a document that it presents to the user based on the selected template.

In some embodiments, the method presents to the user a default document with a set of page designs initially when the user selects the template from the selection of templates. In some embodiments, each template has an associated set of page designs that were specifically designed a priori to match the theme of the template.

Some embodiments provide methods for modifying default content of template documents that have several default text fields. When a user selects a default text field, the method of some embodiments selects the entire default text field for immediate editing by the user. In some embodiments, the method highlights a text field selected by the user. Also, in some embodiments, the method deletes the entire default content of the text field when the user provides new content for the selected field. In some embodiments, the new content can be text, image, or other type of content.

Some embodiments define a template document in terms of several default fields for holding content. Some of these embodiments highlight the different fields on a presented template document as the user drags content over the fields. In some embodiments, several layers form the template document. Instead of, or in conjunction with the highlighting of the fields, some embodiments also highlight the different layers that form the template document as the user drags content over the document. Some embodiments also move and/or change the shape of default fields when a user adds content in the vicinity of the default fields.

Several more detailed embodiments will now be described. These embodiments are implemented by a word processing application. One of ordinary skill will realize that the invention can be implemented within other applications, such as applications for preparing presentations (e.g., Keynote®, PowerPoint®, etc.).

The description below is divided into three sections. Section I describes selecting and configuring a template document with multiple page designs to quickly create a custom document. Section II describes modifying default content provided in a template document. Section III then describes the software design of a document in some embodiments of the invention.

I. Selecting and Configuring a Template

A. Selecting a Template

The word-processing application of some embodiments allows a user to select a template document from a list of template types. The application then presents the user with one or more template pages, one or more of which have default page designs associated with the selected template. As used herein, a template document or page refers to a document or page created by using a particular template before the addition of any user content.

For the user's convenience, the word processing application groups the preconfigured templates into several template types as shown in FIG. 1. Specifically, FIG. 1 shows a template-selection menu 105 that the application presents to the user when the user starts the application or tries to open a new document through the application. As shown in this figure, the template-selection menu includes two display sections, a template-type display section 110 and a template-preview display section 115.

The template-type display section 110 lists the types of templates provided by the application. For instance, in the example illustrated in FIG. 1, this section illustrates the following selectable template types: All, Blank, Newsletters, Journals, Invitations, Stationary, Resumes, Education, and Marketing template types.

The template-preview display section 115 provides a thumbnail preview of each template that the application provides for the template type that is selected in the template-type window 110. In the example illustrated in FIG. 1, the type selected in the template-type section 110 is the "All" type, which, in some embodiments, includes all the template types. Accordingly, in this example, the template-preview display section 115 provides a thumbnail preview of all the templates provided by the application.

Figure 2:
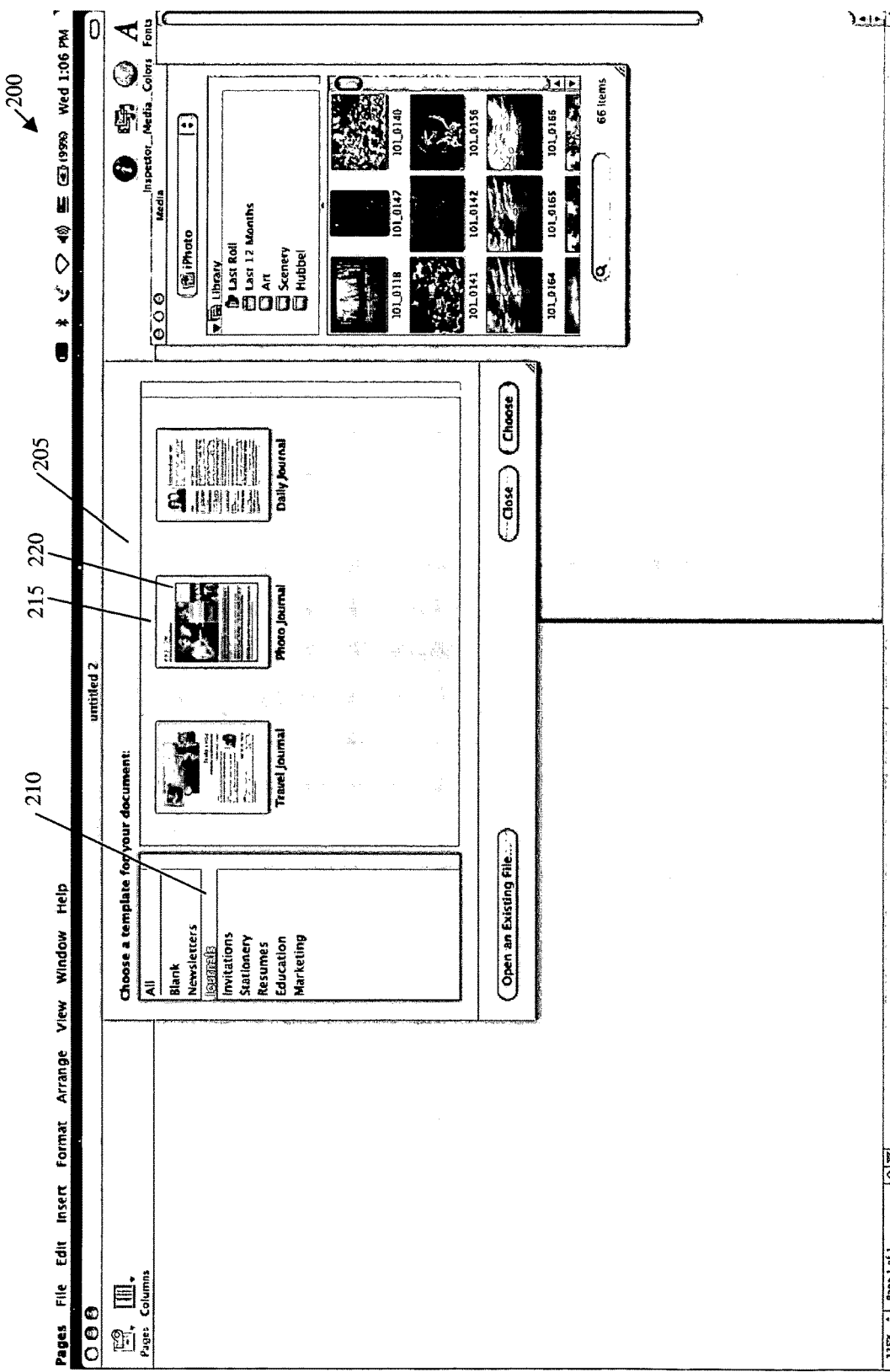
FIG. 2 illustrates a Photo Journal template among the Journal type templates.

On the other hand, FIG. 2 illustrates an example where a user has selected the Journal template type 210 in the template-type section 110. Hence, in this example, the template-preview display section 215 illustrates thumbnail previews of each journal template provided by the application. These templates include Travel, Photo, and Daily Journal templates.

Figure 3:
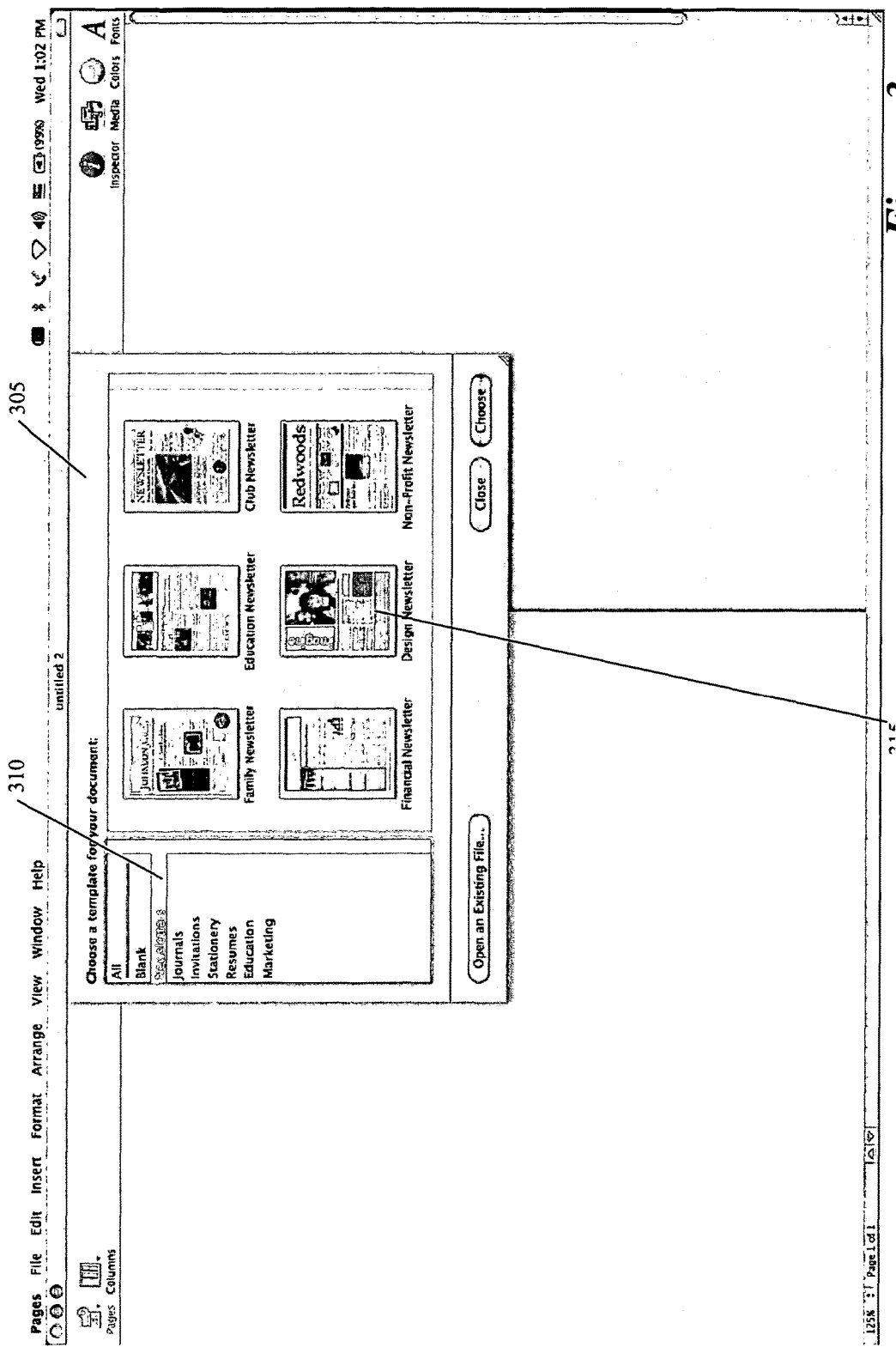
FIG. 3 illustrates an example where a user has selected the Newsletters type.

Similarly, FIG. 3 illustrates an example where a user has selected the Newsletters type 310. In this example, the template preview section 115 illustrates thumbnail previews of each newsletter template provided by the application. These templates include Family, Education, Club, Financial, Design, and Non-Profit newsletter templates. In the examples described above, each thumbnail preview in the preview section 115 is a preview illustration of a first page design for each template available in the menu 105.

B. Viewing Template Document and Adding Template Pages

Figure 4:
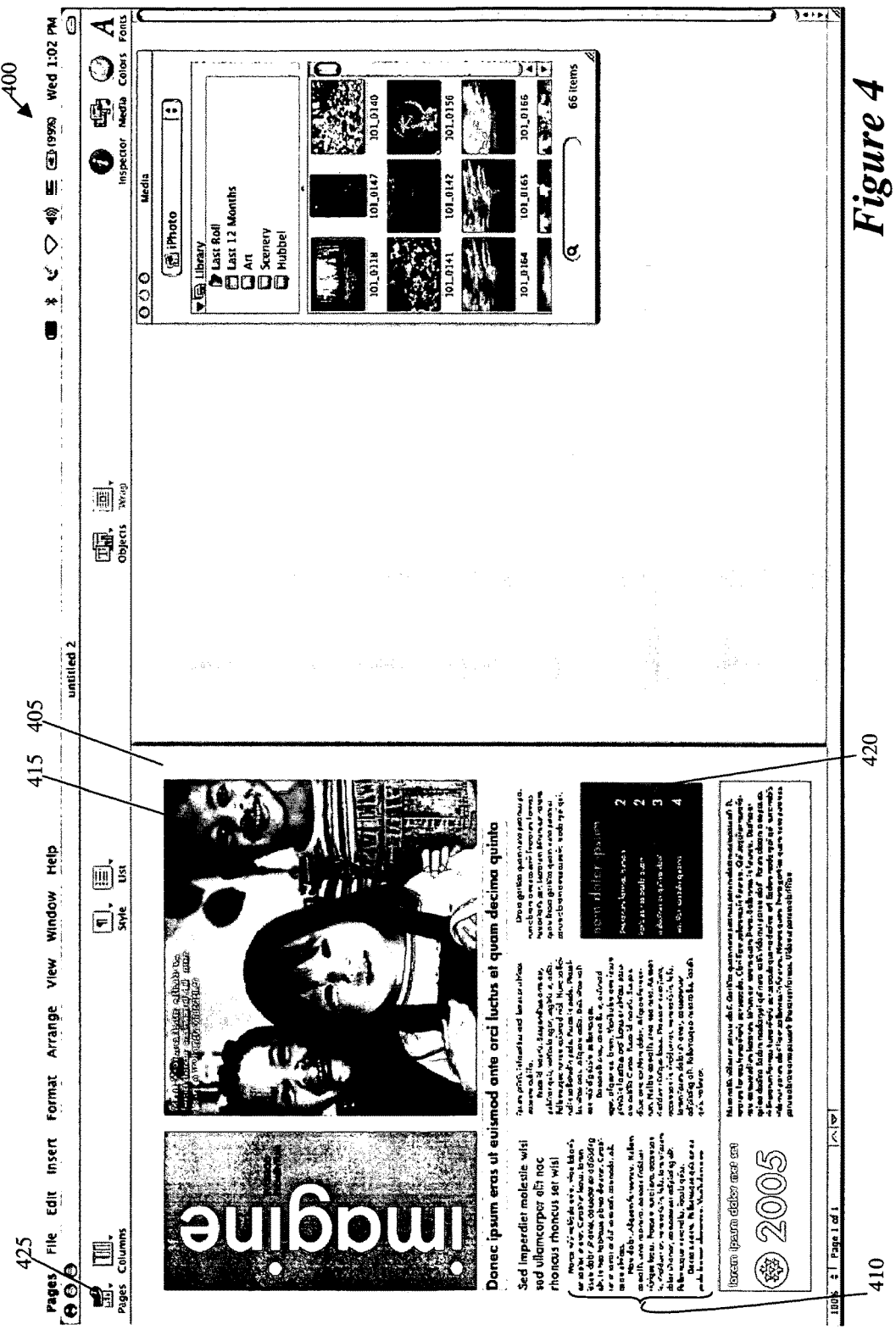
FIG. 4 illustrates a Cover page design of the Design Newsletter template.

When a user selects one template from the preview section 115, the application presents to the user a template document based on the selected template. For instance, FIG. 4 illustrates the presentation of a page 405 based on the Design Newsletter template 315 (previewed in FIG. 3). The application would display this page to the user when the user selects the Design Newsletter template 315 in the template-preview section 115. For some templates, the application presents a template document with only one page, while for other templates the application presents a template document with several pages. Each template page that the application presents to the user has a default page design that is associated with the selected template.

Figure 5:
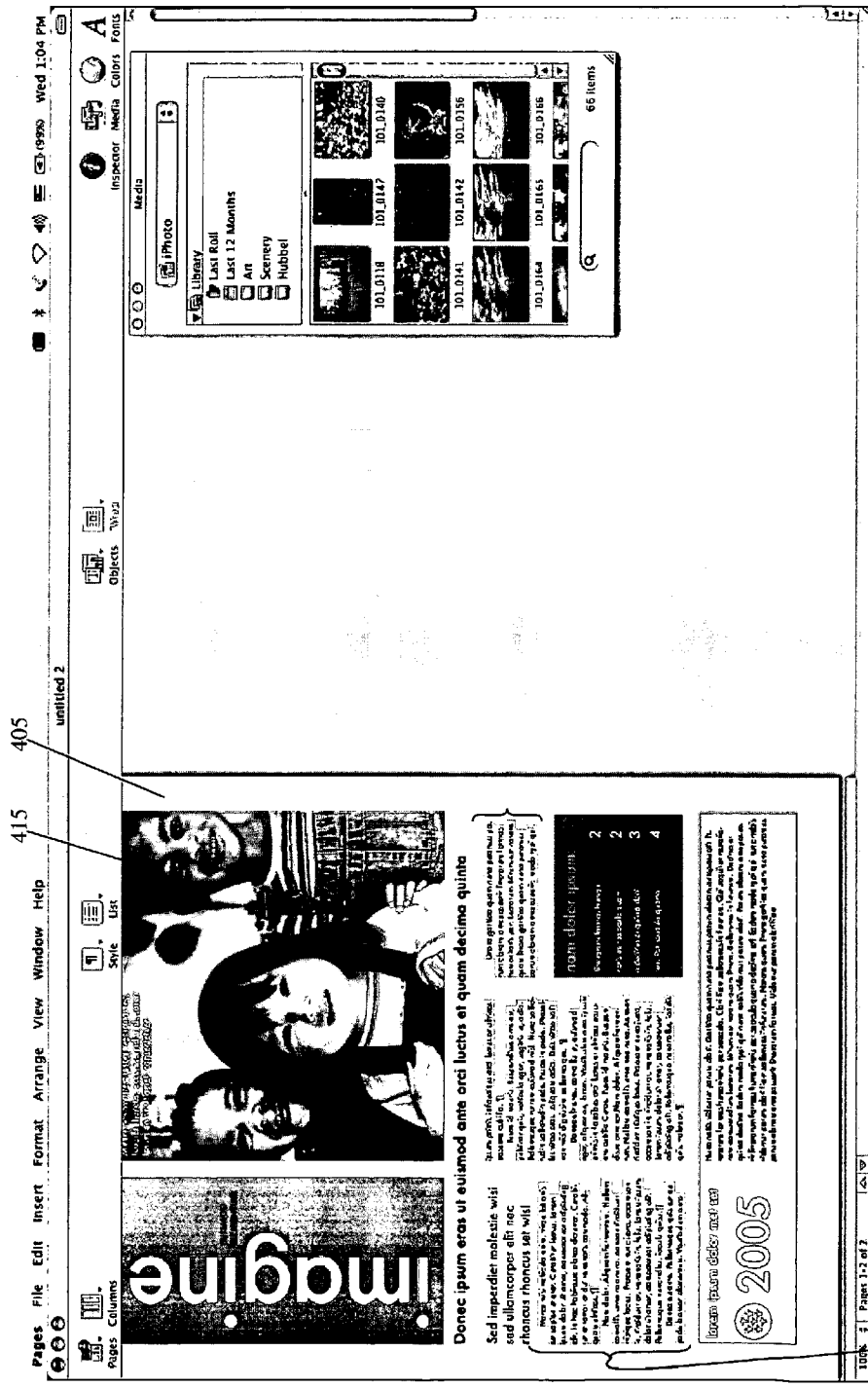
FIG. 5 illustrates the entire contents of a field in the page design selected and highlighted with just a single click of a pointing device.

Also, in some embodiments, each template page has one or more content fields that are populated by default placeholder content that can be quickly removed and/or edited by the user, as further described below in Section II. These fields typically contain default content that suggests to the user the expected appearance of the user's own content. For instance, the page 405 shown in FIG. 4 is based on the Cover page design of the Design Newsletter template. As shown in FIG. 4, a first field 410 in the center of the page 405 contains default content in the form of placeholder text. The default content generally conveys to the user the font and formatting that is used in the field 410. In addition, when highlighted, the placeholder text of the first field 410 delineates the border of the first field 410 from the surrounding template page 405 and other fields (e.g., a second field 415), as shown in FIG. 5.

Figure 6:
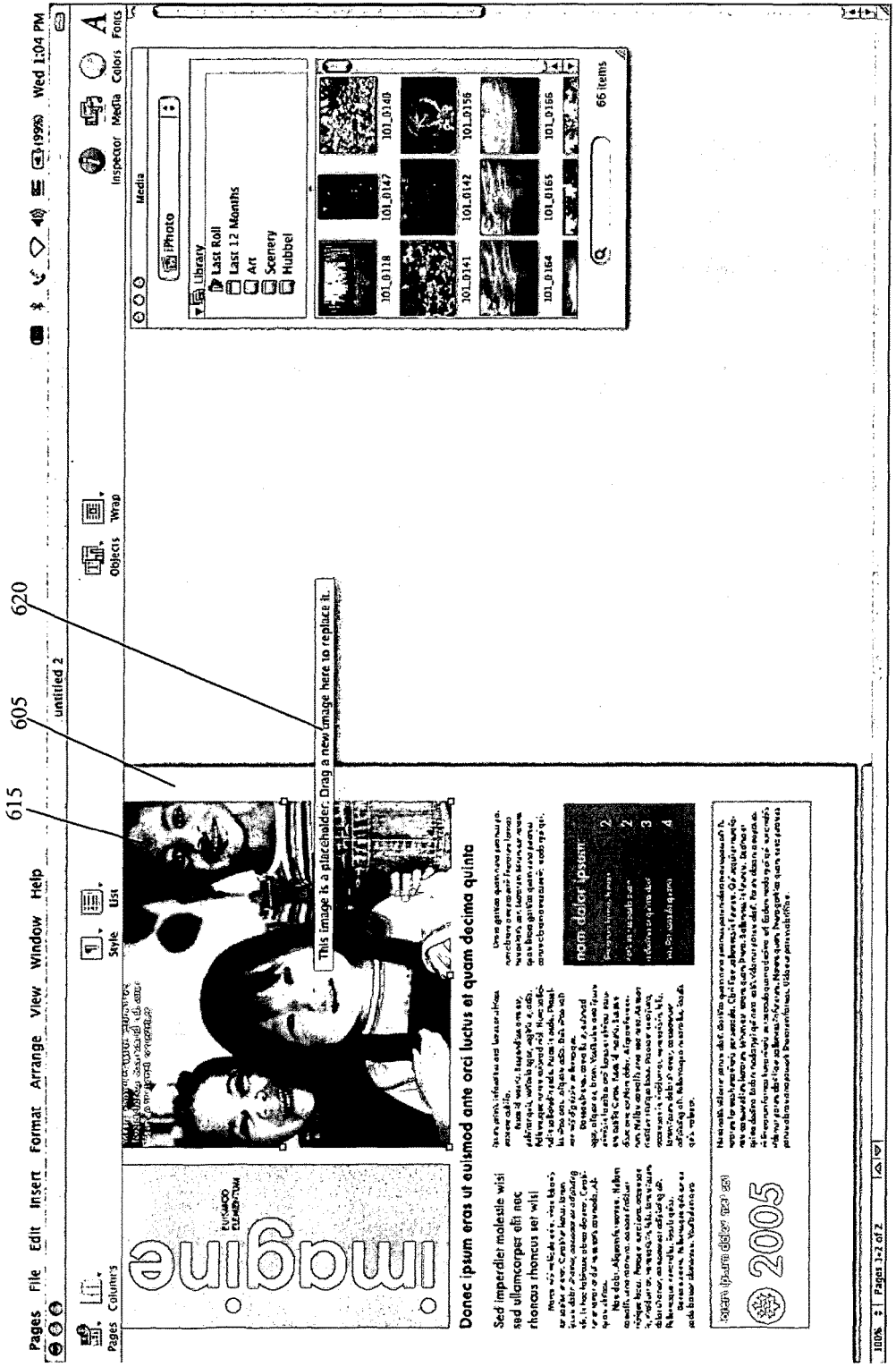
FIG. 6 illustrates a prompt to a user that the image contents of a field are merely a placeholder that is intended to be replaced by the user's own content.

In some embodiments, placeholder text is in Latin to distinguish the placeholder text from the user's own content. However, any number of languages, symbols, or other distinguishing content could be used as a placeholder in the first field 410. In addition to text, the default content of a template page might include other placeholder content, such as images, graphics, colors, sounds, video, etc. For instance, FIG. 6 shows an image occupying a field 415 in the upper right portion of the template page 605. As shown in this figure, when the cursor is placed over such a field 615, the user is prompted by a message 620 stating that the contents of the field merely represent a placeholder for the user's own content.

Figure 7:
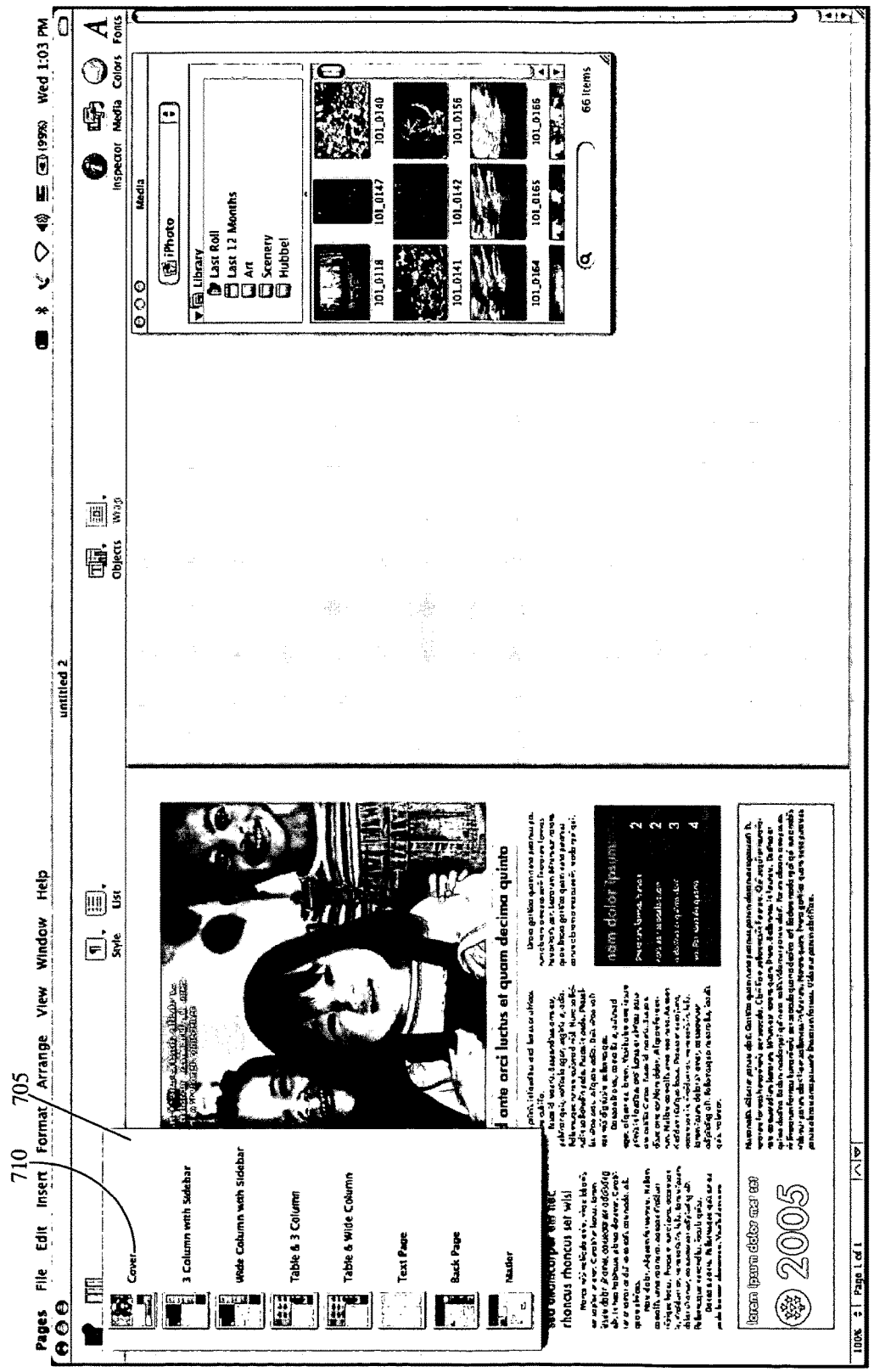
FIG. 7 illustrates a dropdown menu for selection of additional page designs in the Design Newsletter template.

Once the application presents a template document to the user, the user can get a list of other page designs that the user can use to add other template pages to the template document. This list is accessible to the user in a variety of ways. One way is through the menu options on top of the application's window. Another way is through a "Pages" icon 425 illustrated in FIG. 4. When the user selects this icon 425, a dropdown menu 705 appears to list several additional page designs that may be added to the template document currently open for editing, as shown in FIG. 7.

When the Design Newsletter template 315 is selected, the application creates a template document and specifies the first page of that document to have the first page design of the selected template 315, as shown in FIG. 4. As shown in the dropdown menu 705 in FIG. 7, the first page illustrated in FIG. 4 is the "Cover" page design 710 of the Design Newsletter template. The dropdown menu 705 also identifies the following page designs for the Design Newsletter template: 3 Column with Sidebar, Wide Column with Sidebar, Table & 3 Column, Table & Wide Column, Text Page, Back Page, and Mailer.

Figure 8:
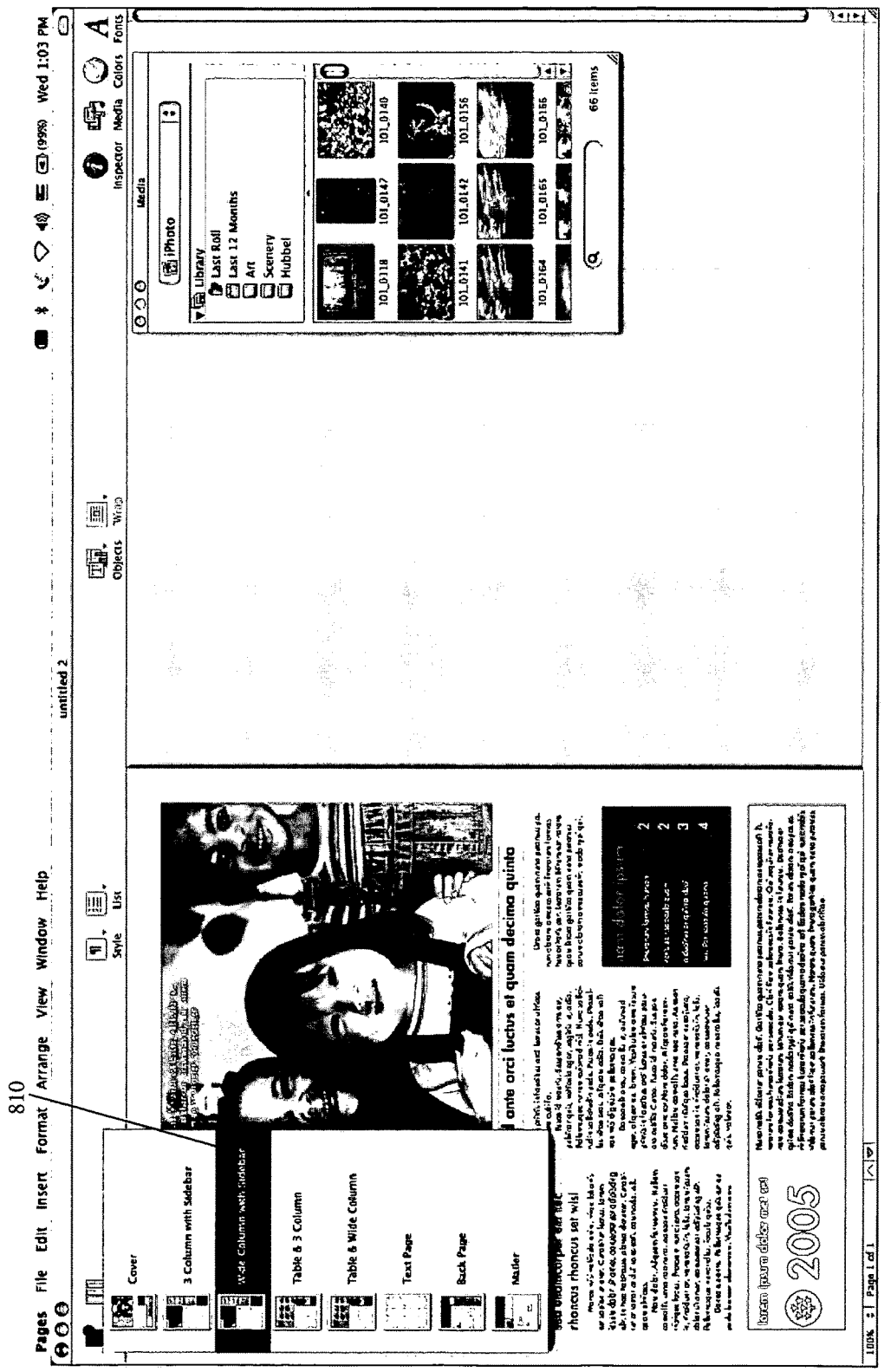
FIG. 8 illustrates selection of a Wide Column with Sidebar page design for insertion after the Cover page design in the Design Newsletter template.
Figure 9:
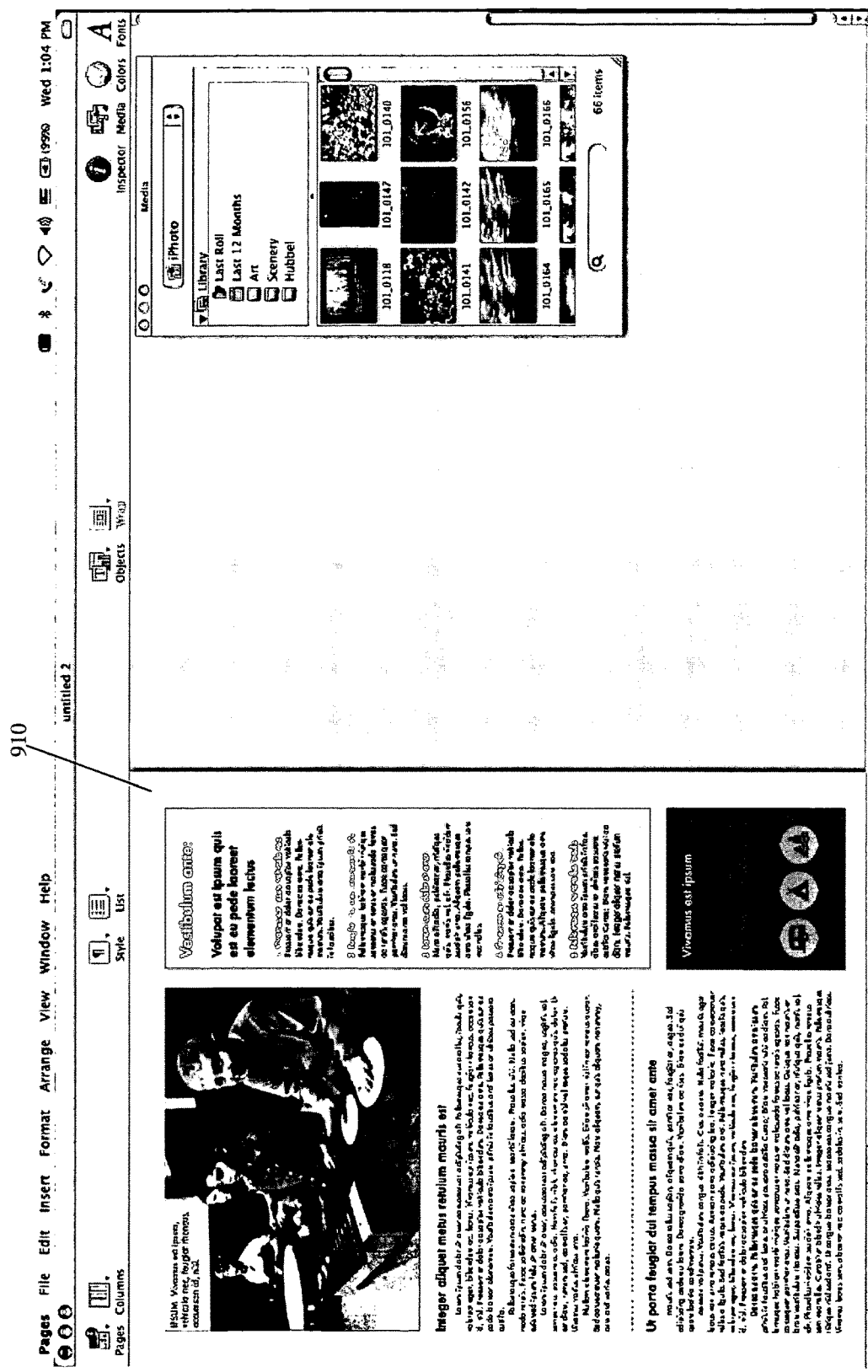
FIG. 9 illustrates the Wide Column with Sidebar page design inserted into the open document after the Cover page design.

The user may select one or more of the additional page designs from the dropdown menu 705 to custom configure the current template document created by using the Design Newsletter template. For instance, FIG. 8 shows the selection of the Wide Column with Sidebar page design 810. FIG. 9 illustrates the subsequent addition to the newsletter template document of a page 2 with the page design 810. As shown in FIG. 9, once the additional template page is inserted into the current template document, some embodiments display the most recently added page 910. Also, in some embodiments, the addition of a template page to a template document inserts the newly added template page after the template page currently in view. In this case, the page 2 is added after the default cover page of this template, which the application initially added to the document.

To further illustrate the current example, insertion of an additional template page to the current template document will be described. The result is a three-page template document. However, one of ordinary skill will recognize the many permutations of page design combinations possible for each template document.

Figure 10:
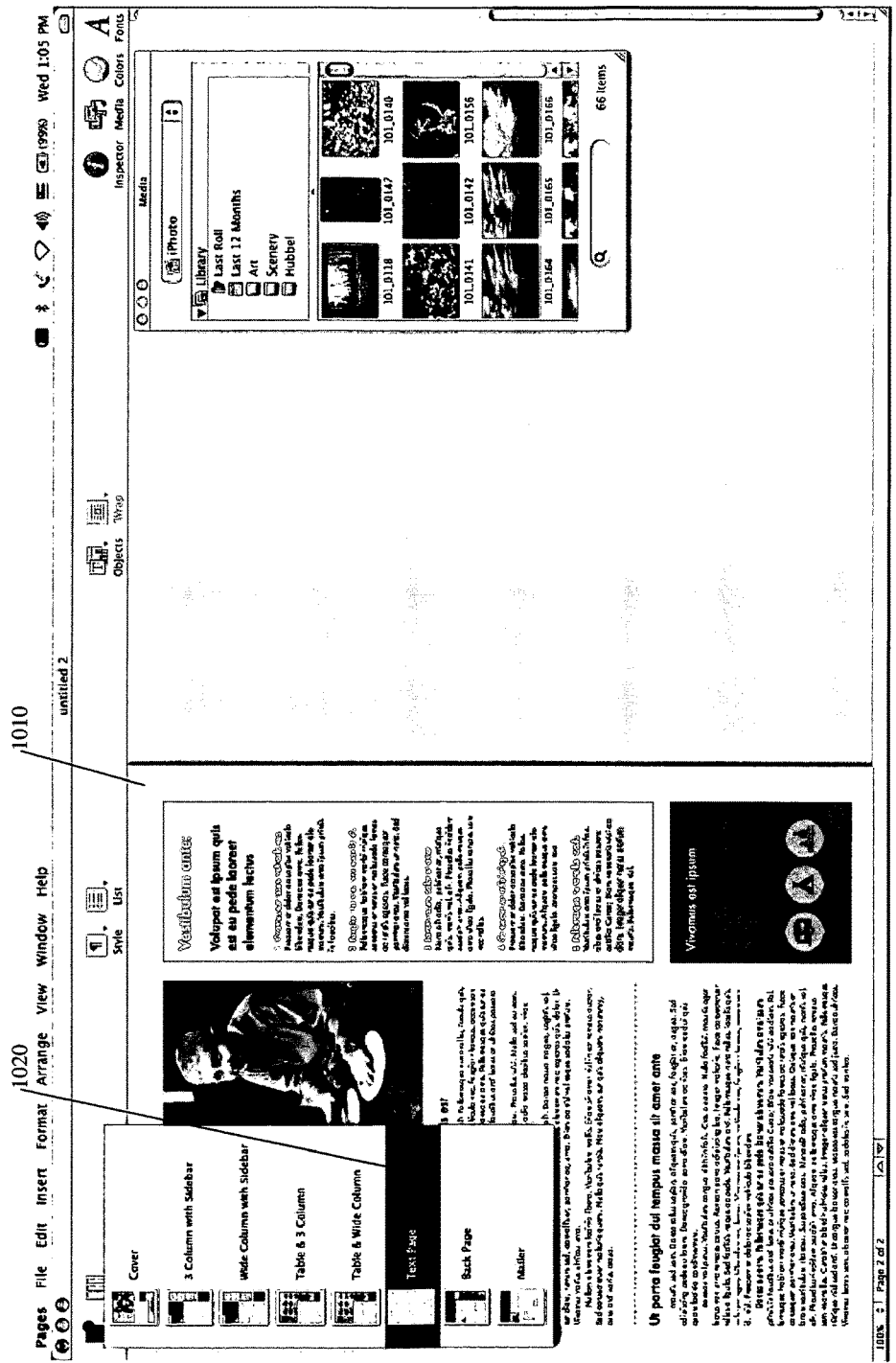
FIG. 10 illustrates selection of a Text Page for insertion into the open document.
Figure 11:
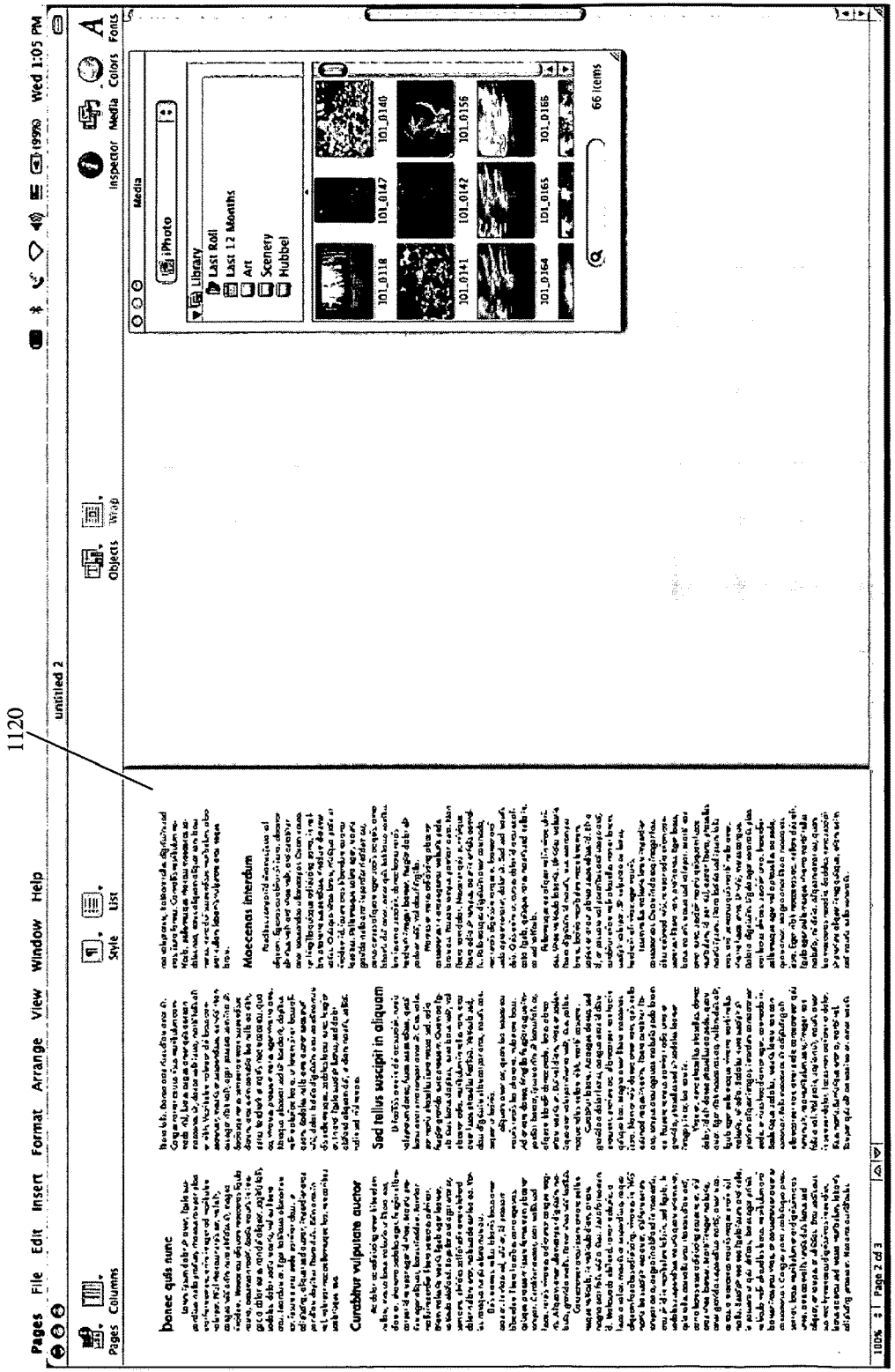
FIG. 11 illustrates the Text Page inserted into the open document.
Figure 12:
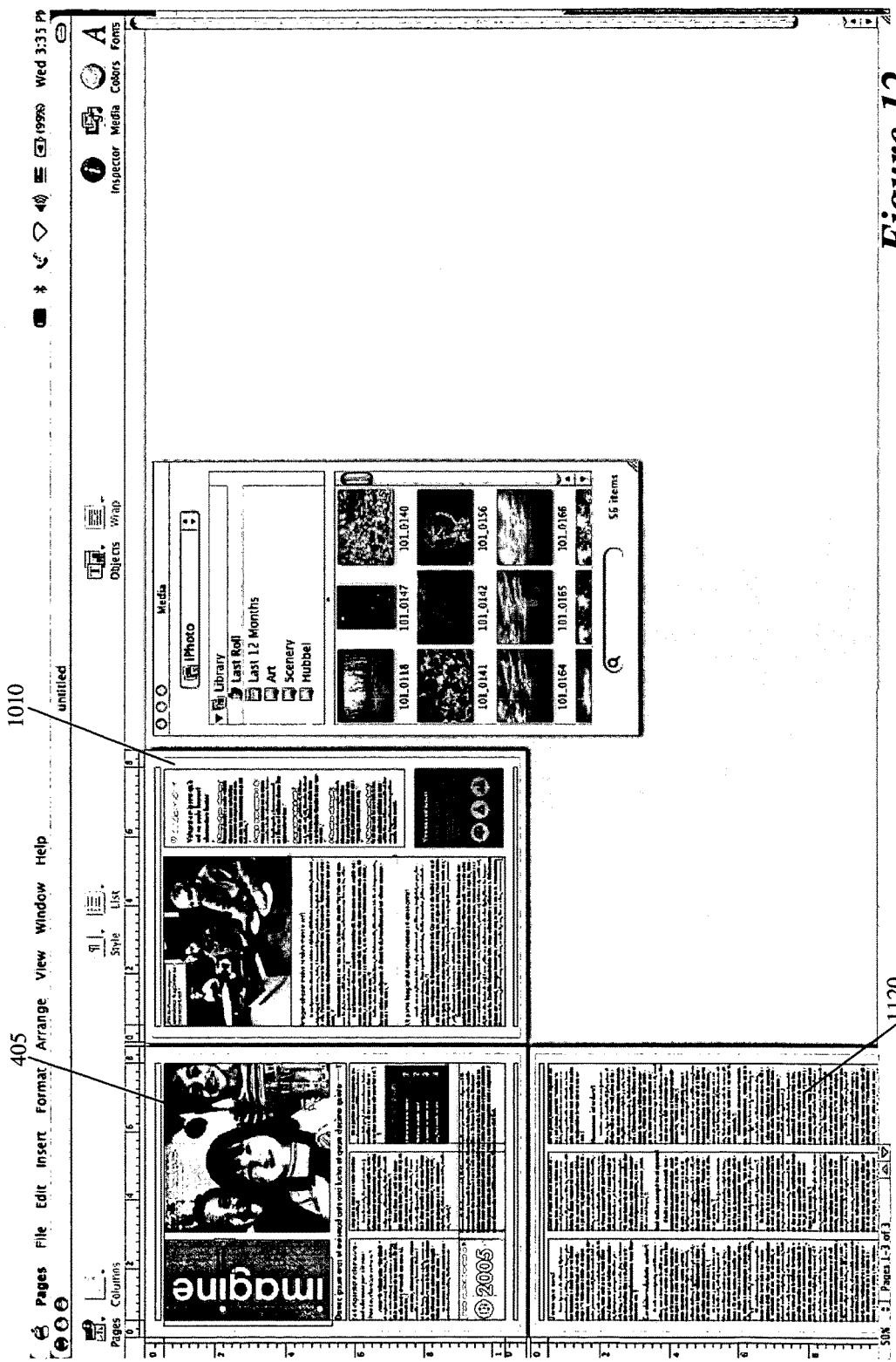
FIG. 12 illustrates the inserted page designs, the Cover, the Wide Column with Sidebar, and the Text Page, together in the same open document.

FIG. 10 shows the Text Page design 1020 selected for insertion after the Wide Column with Sidebar page design 1010. FIG. 11 then shows the newly added template page 1120, which is based on the Text Page design 1020, inserted after the previously added template page, which was based on the Wide Column with Sidebar page design. As shown in FIG. 12, the result is a three-page template document that includes three template pages with, respectively, a cover page 405, a wide-column-with-sidebar page 1010, and a text page 1120.

Figure 13:
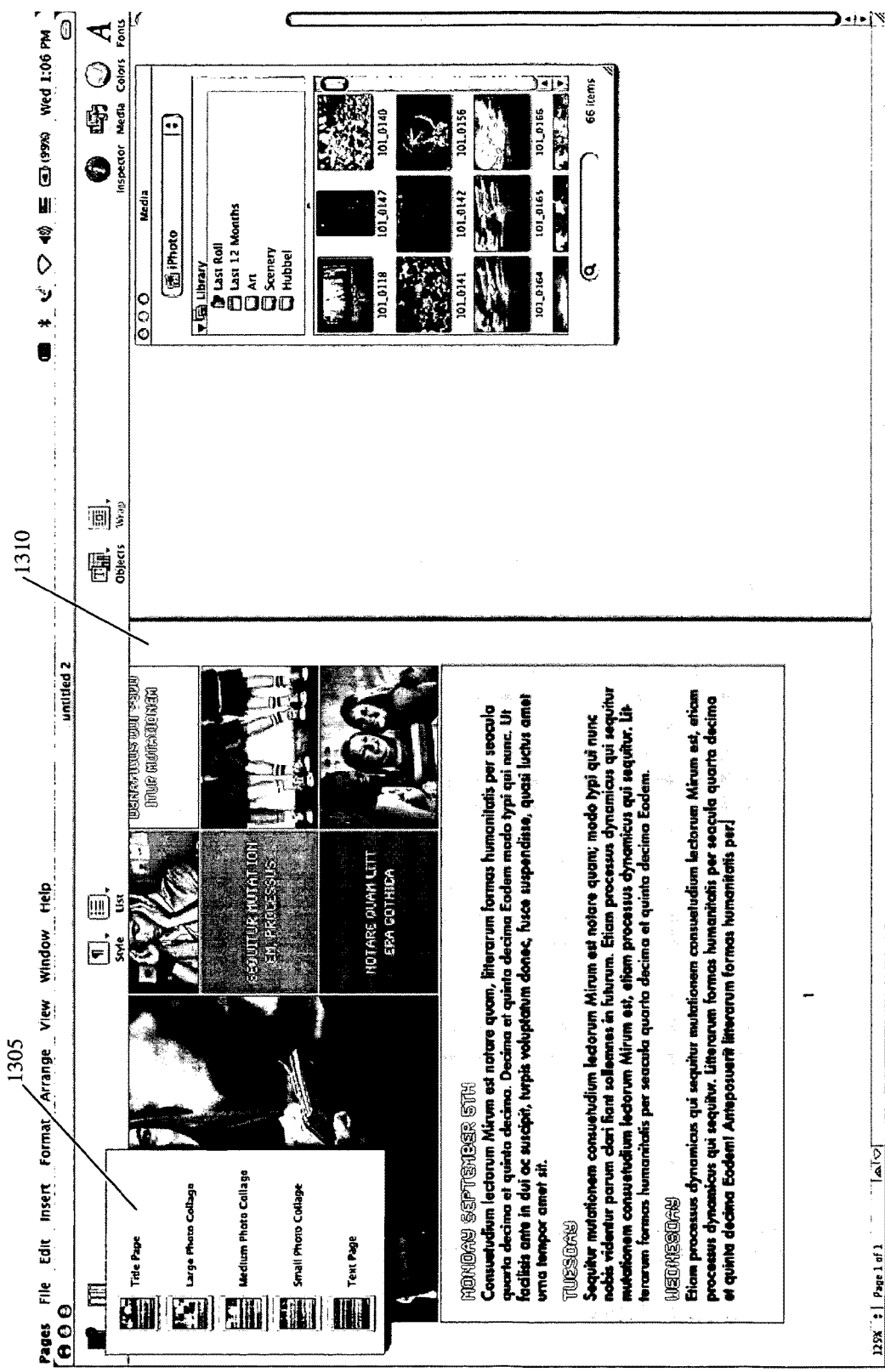
FIG. 13 illustrates a Title Page design of the Photo Journal template.
Figure 14:
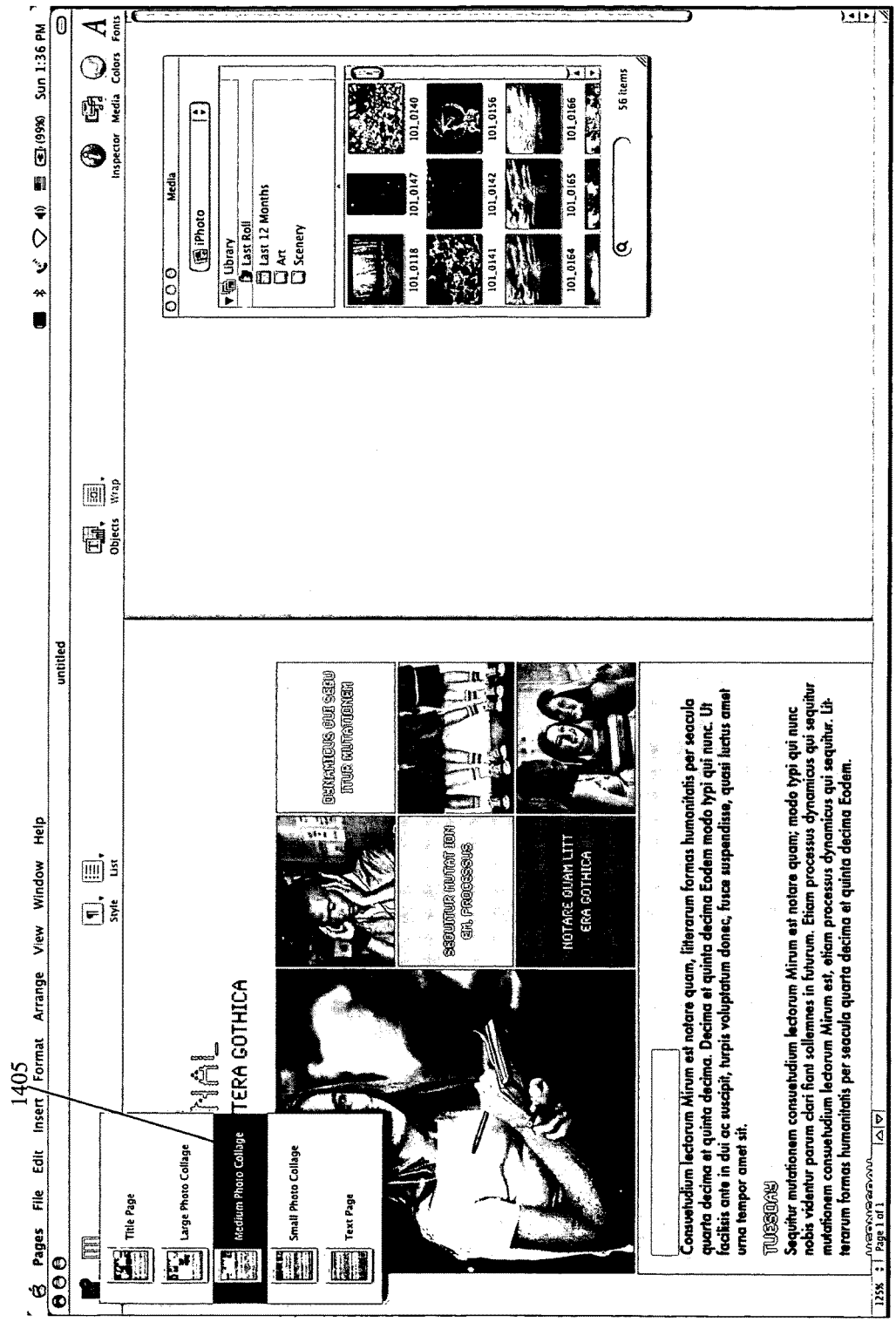
FIG. 14 illustrates a selection of a Medium Photo Collage page design of the Photo Journal template.
Figure 15:
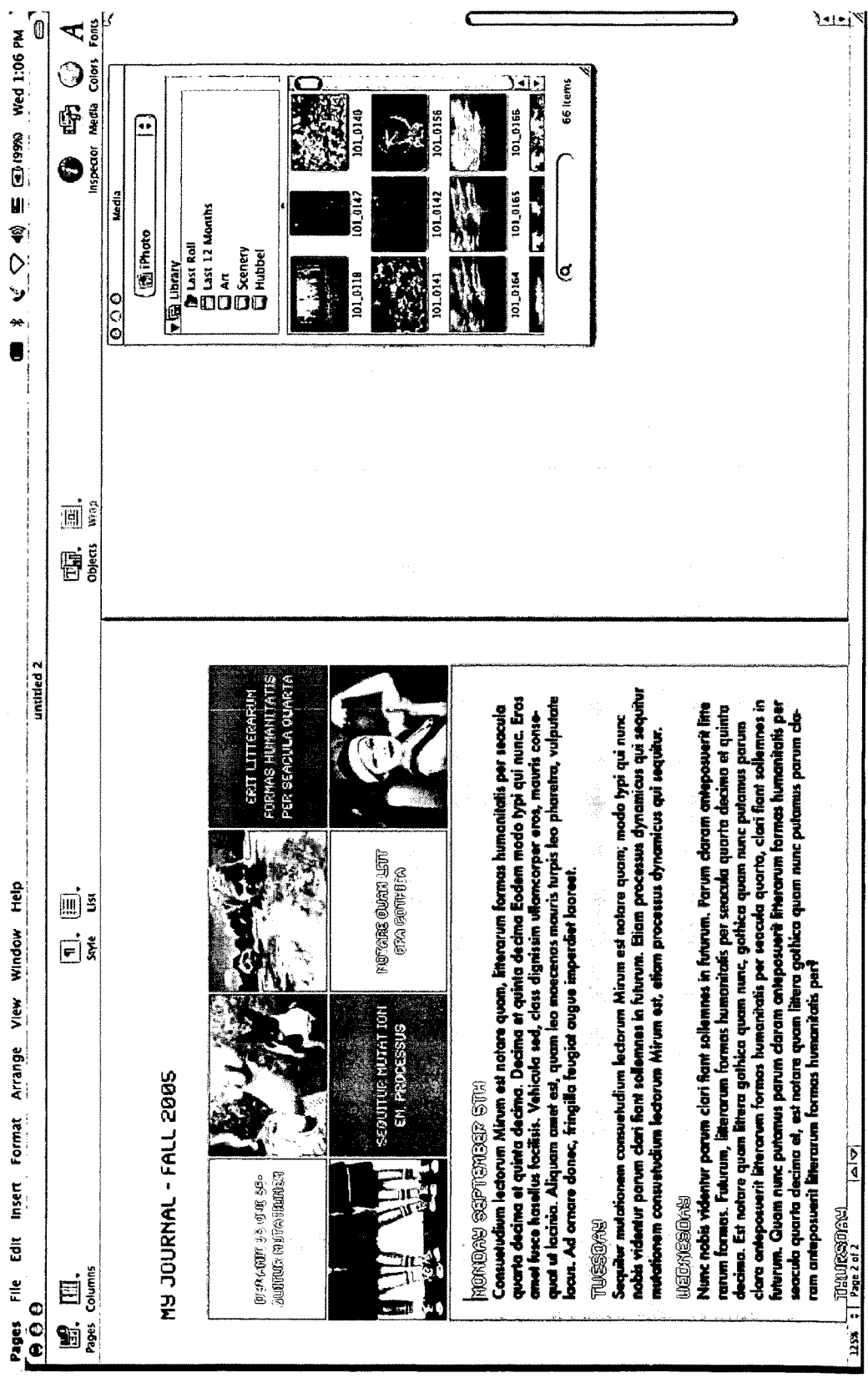
FIG. 15 illustrates a Medium Photo Collage page design added after the Title Page design in the Photo Journal template.

FIGS. 13, 14, and 15 provide another example of adding template pages to a template document. In the example shown in FIG. 2, the Journals templates 210 are chosen for display in the menu 205. When the Photo Journal template 220 is selected from the menu 205, the application creates a template document and specifies the first page of that document to have the first page design of the selected template 210, as shown in FIG. 13. As shown in the dropdown menu 1305 in FIG. 13, the first page design 1310 in the Photo Journal template is the Title Page design.

As mentioned above, each template has multiple different user selectable page designs that conveniently can replace or supplement the default page design(s) presented to the user in the default template document. For instance, the dropdown menu 1305 in FIG. 13 identifies the following page designs for the Photo Journal template: Title Page, Large Photo Collage, Medium Photo Collage, Small Photo Collage, and Text Page designs.

A user may assemble various permutations of these page designs in the presented template document to create a custom template document. For instance, FIG. 14 illustrates the selection of the Medium Photo Collage page design 1405. FIG. 15 illustrates the subsequent addition to the Photo Journal template document of a page 2 with the page design 1405. The newly added page 2 is inserted after the Title Page within the Photo Journal template document. Template pages may also be moved within a template document and removed from the template document in similar fashion.

In sum, the application allows a user to create a template document and add or delete one or more template pages that are based on one or more page designs, in order to create a desired template configuration. The page designs that are specified for a template are designed to match the theme of the template. In some embodiment, the selectable page designs are not only pre-designed, but may also have pre-specified formatting rules for automatic formatting of content. The pre-designed content and formatting aids a user who may have little knowledge of design principles or computer programming in quickly turning various content into aesthetically pleasing page designs.

Some embodiments allow the user to modify the preconfiguration of both existing and new templates and page designs in order to create custom user defined templates and page designs. These embodiments use a master page model that has three master pages (first, even, and odd master pages). A user can modify the page masters to create custom templates. The user in these embodiments may further create custom page design masters for the newly created custom templates.

II. Adding and Removing Content

Once a template and page design(s) are selected to create a template document, the invention allows the user to easily modify the default content provided by the application, in order to quickly create a personalized user document. The user can modify the template document by adding new content, changing or deleting default content, importing or dragging existing content, etc. Content includes text, image, graphics, animation, video, audio, etc.

The invention's word processing application allows the user to select existing content and add this content to a page of the document through a variety of known manners in the art. For instance, the content can be selected from a menu within the application, from a file, from another application, etc., and it can be added to a page through a cut-and-paste operation, a drag-and-drop operation, etc.

Figure 16:
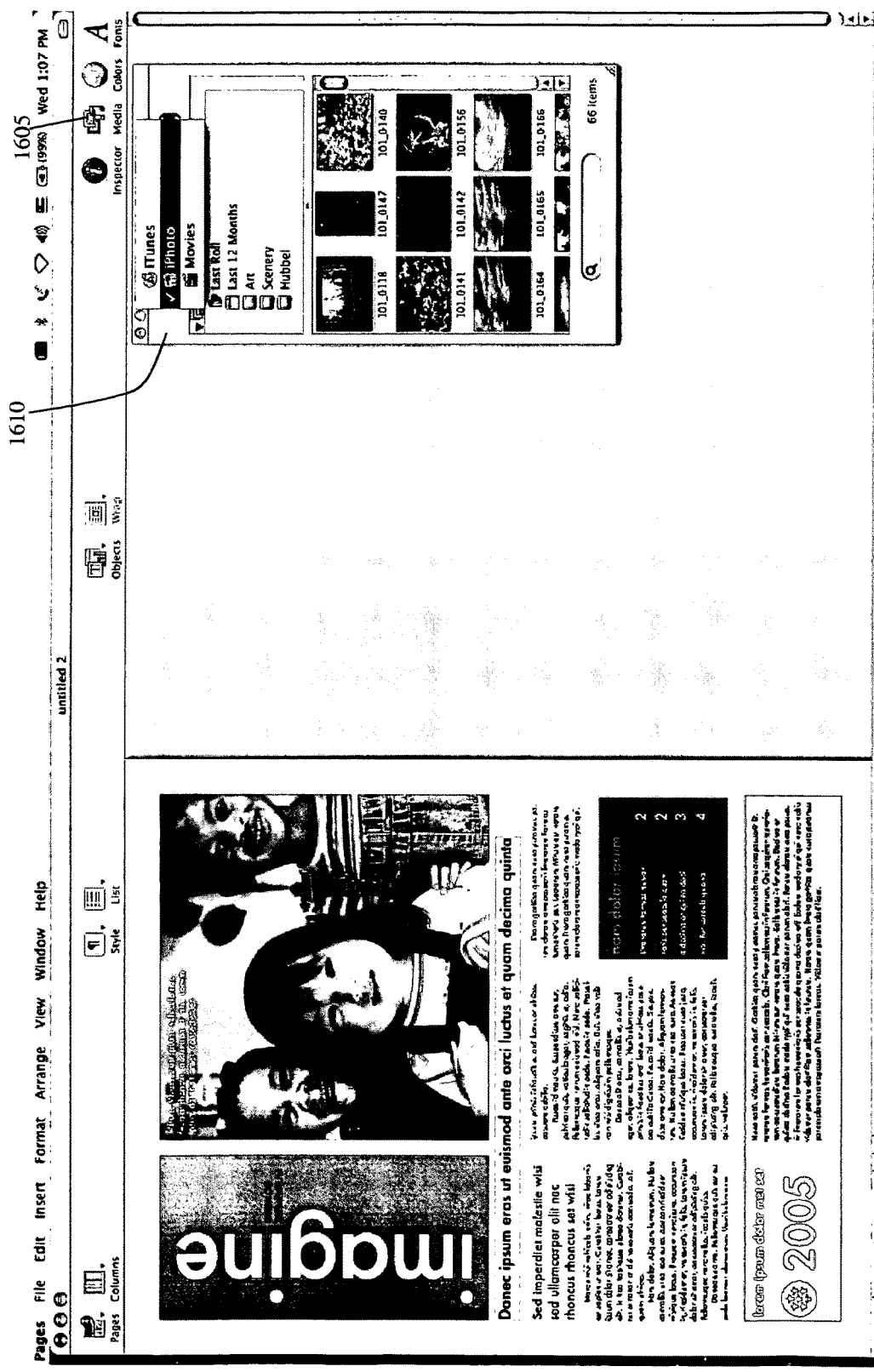
FIG. 16 illustrates a media button and media library for adding content next to a page design currently being viewed for editing.

The invention's application also provides unique ways for importing existing content into a document. Specifically, as illustrated in FIG. 16, the application includes a media button 1605 for accessing a library 1610 of media (i.e., content) on the computer. As shown in this figure, the media library 1610 allows a user to access content from a variety of files external to the page 405 of a document being edited. For instance, in some embodiments, these external files might include iTunes®, iPhoto®, and Movie (e.g. Quicktime®, etc.) files. More generally, the media button 1605 may be used to access a variety of content from a spectrum of media such as TIFF, GIF, JPEG, PDF, PSD, EPS, PICT, MOV, FLASH, MP3, MP4, AIFF, AAC, etc. Since content can be exchanged (i.e., moved to and from the media library 1610), some embodiments further allow easy building or augmentation of the media library 1610.

A. Replacing Placeholder Text with Text

Template pages are preconfigured with fields and placeholder content within the fields to suggest to a user a design format for the user to quickly add new content, which will supplement or replace existing content. The result is quick creation of attractive pages containing the user's own content.

1. Click Select Field

To facilitate the user's selection of a text field, some embodiments select the entire text field when the user selects any part of the field (e.g., clicks on a word in the text field). These embodiments select the placeholder text in its entirety to simplify the replacement of this text. Also, some of these embodiments highlight the entire field (e.g., in yellow) to reflect the selection of the field in its entirety.

Figure 17:
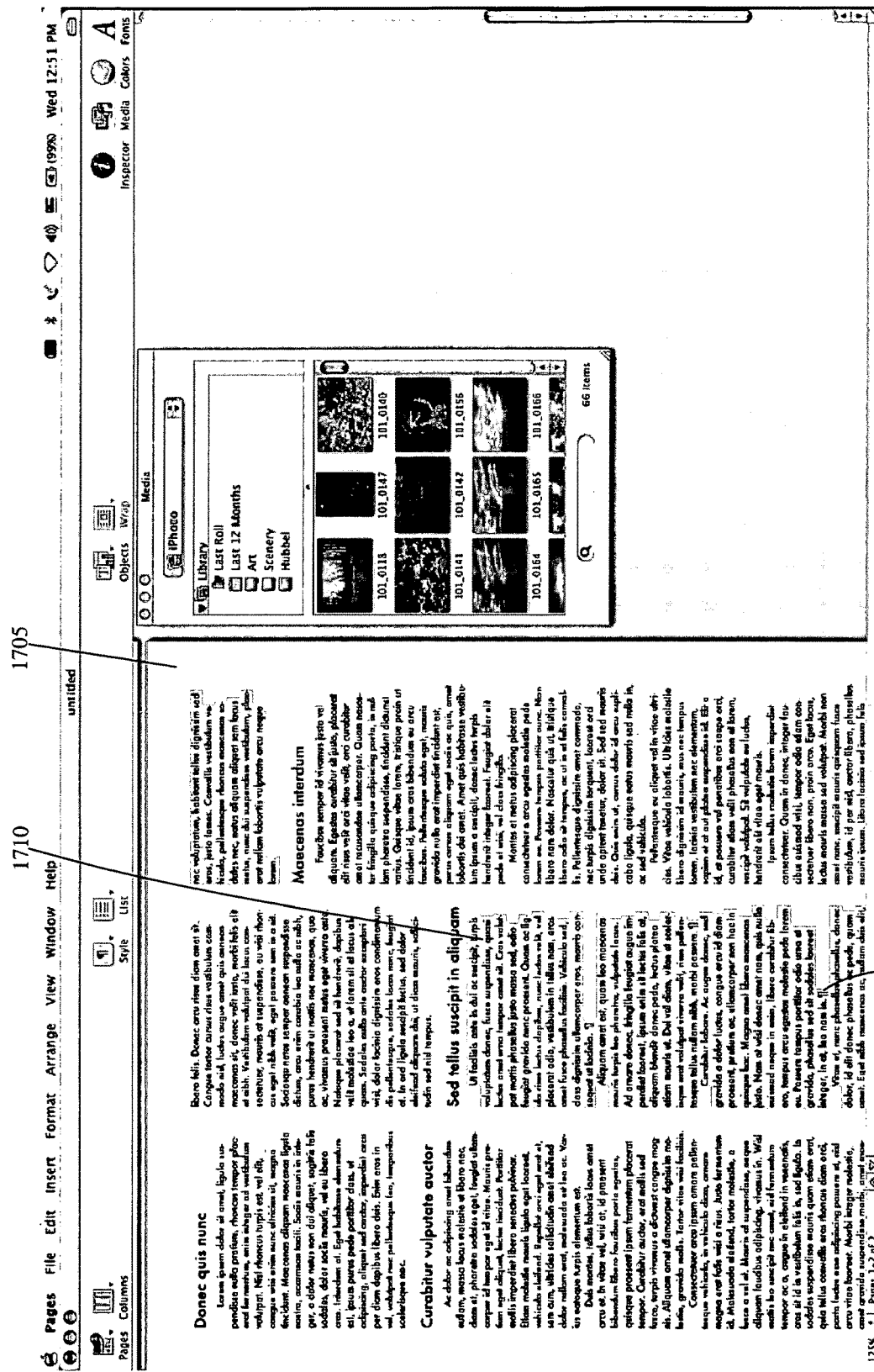
FIG. 17 illustrates the entire contents of a field containing placeholder text selected by a single click of the pointing device.
Figure 18:
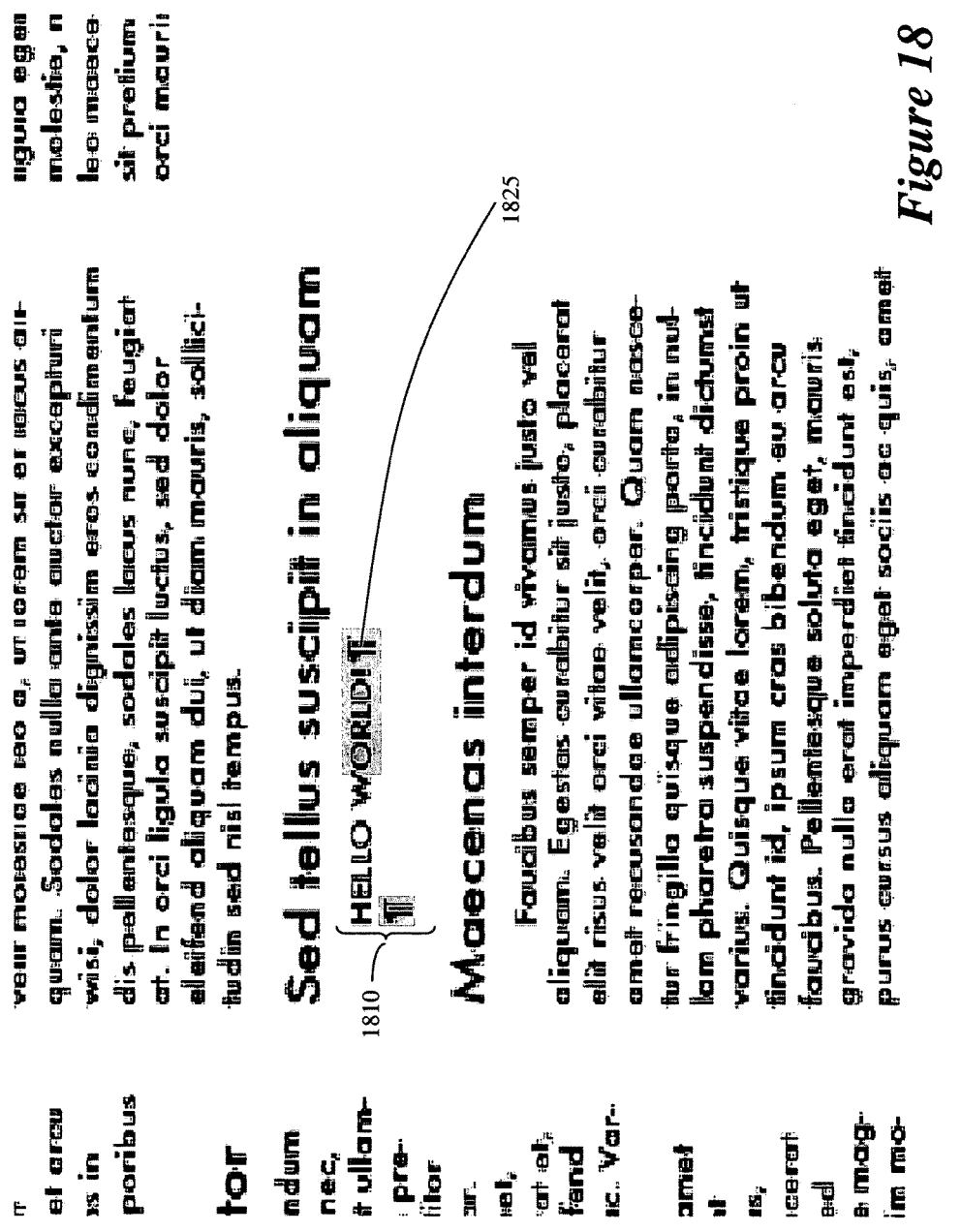

For instance, FIG. 17 illustrates a user selecting a field 1710 that contains default placeholder text in the text page 1705, which is based on a Text Page design of the Design Newsletter template previously described. As shown in this figure, the entire contents of the field 1710 (i.e., all the default placeholder text) are selected with a single click. Then, as shown in FIG. 18, the user has typed "HELLO WORLD!" to replace the default placeholder text that was selected in FIG. 17. In this example, the default placeholder text is replaced by the user typed text. However, one of ordinary skill in the art will recognize that the default placeholder text might be replaced through a variety of methods such as a drag-and-drop or a cut-and-paste operation.

2. Paragraph Character Revealed

In some embodiments, a drag or select operation in a field reveals the underlying formatting of the content within the field. This underlying formatting might include hidden characters such as a paragraph character (e.g., a paragraph character between in line text). This feature is particularly useful for a user, while modifying the content of a field, to quickly understand the relationship between the in line content in the field. For instance, paragraphs may need to be removed or added to enhance the view of content within the field.

FIG. 17 shows a page 1705 in a field 1710 currently selected for editing. In FIG. 17, the entire contents of the field 1710 are highlighted and the default placeholder text in the field 1710 reveals such formatting (e.g., hidden paragraph character 1725). FIG. 18 shows a paragraph character 1825 that is revealed after the selection of a portion of the text that the user added. In some embodiments, these hidden characters are displayed in blue to offset the yellow color used to highlight text in these embodiments.

B. Replacing Placeholder Text with Multimedia

Figure 19:
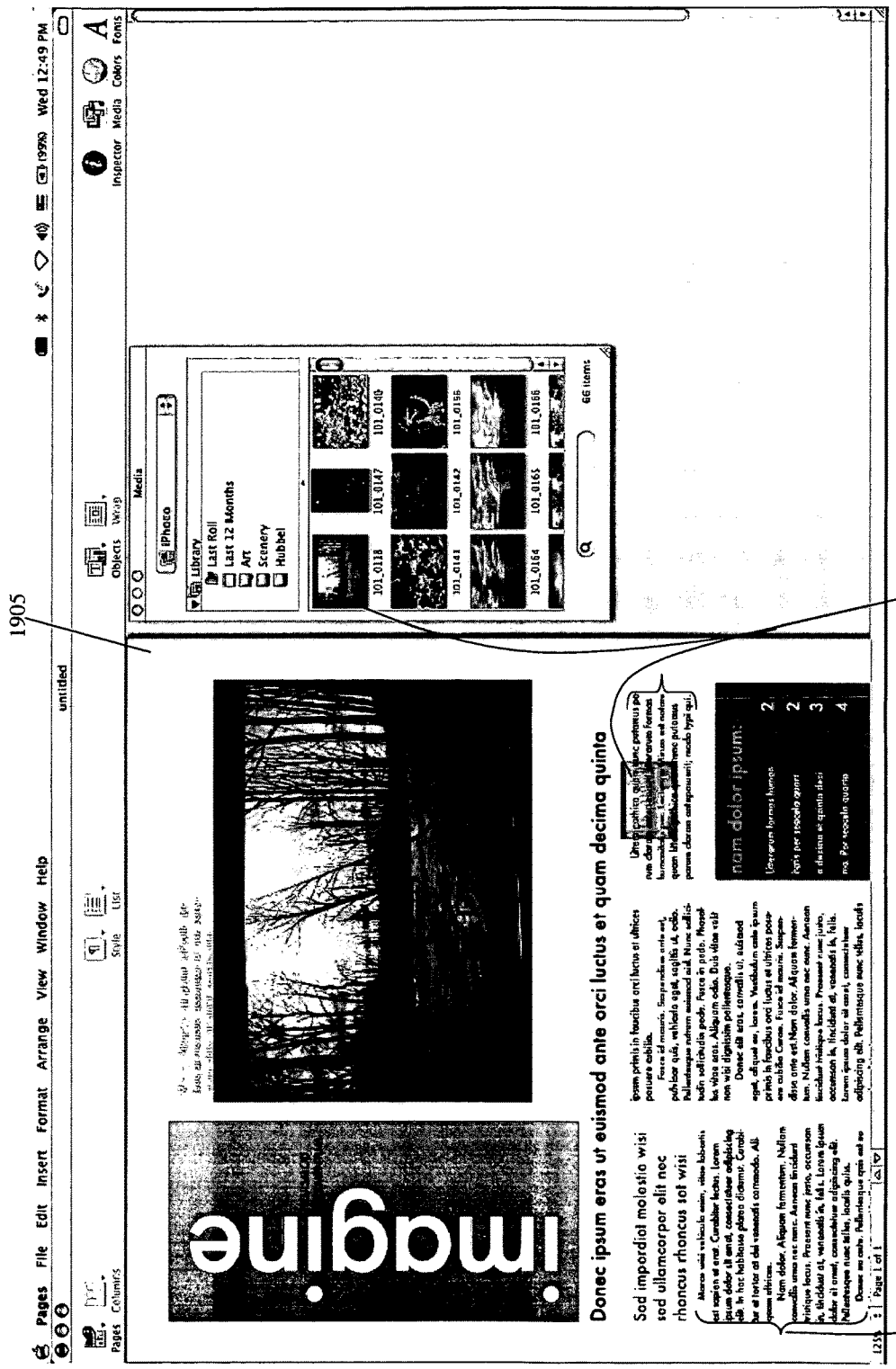
FIG. 19 illustrates a multimedia graphic selected in the media library to replace placeholder text in a field of the page design currently being viewed for editing.
Figure 20:
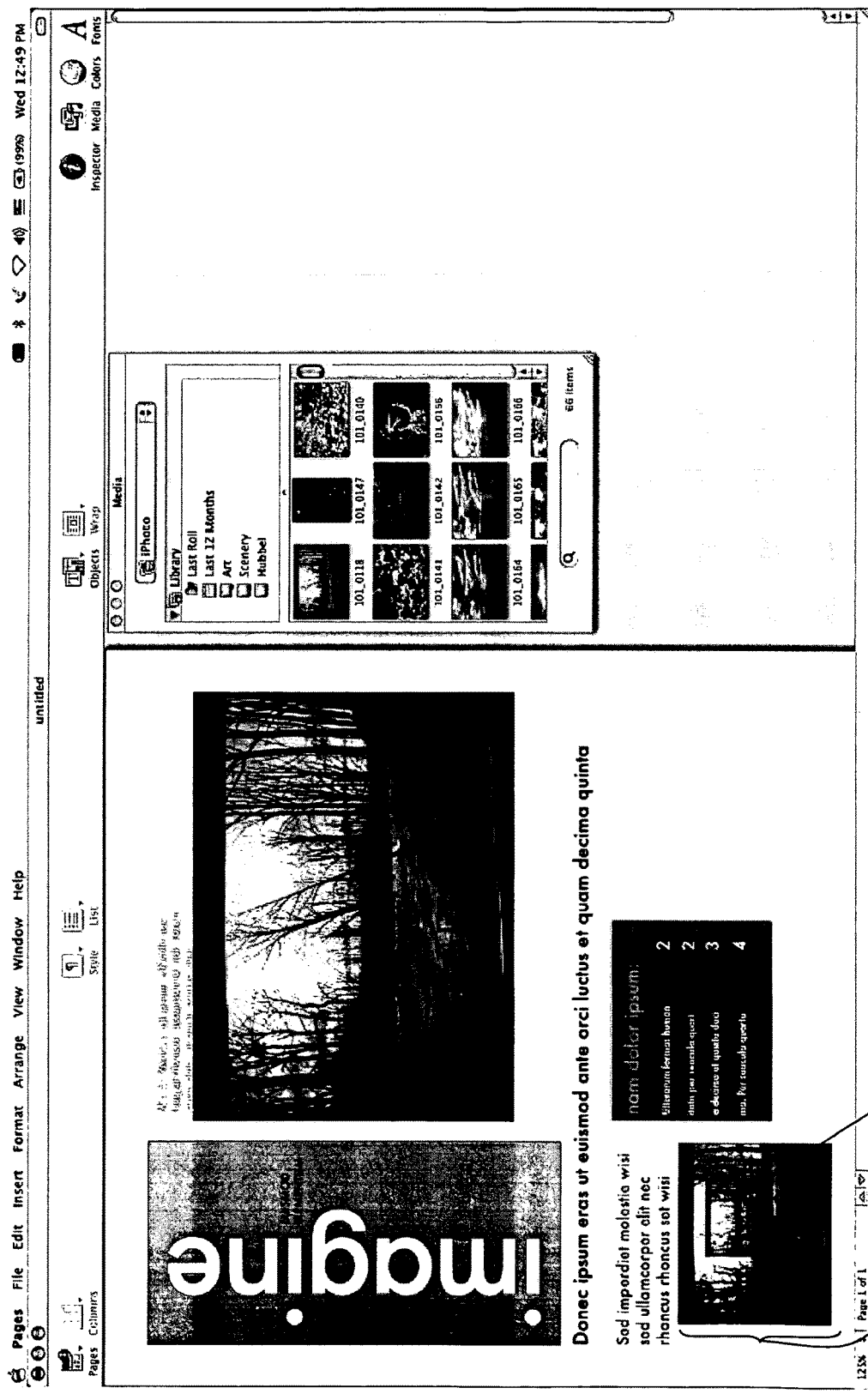
FIG. 20 illustrates the placeholder text contents of the field being replaced with content from the media library by using a single (drag-and-drop) operation.

Just as text can replace text, so can non-text content replace text content and vice versa. For instance, FIGS. 19-20 illustrate an example of an image replacing placeholder text in a field. In FIG. 19, an image 1910 is selected and dragged across the page 1905. This image 1910 is then dropped onto a field 1920, which contains a large amount of text. As shown in FIG. 20, this single (drag-and-drop) operation has replaced the entire volume of text in the field 1920 with the image 1910. As shown in this figure, the field 1920 has been automatically reformatted to account for the size and dimensional characteristics of the inserted image 1910. In other embodiments, the placed content is formatted and/or reformatted to adjust to the characteristics of the field instead.

C. Replacing Placeholder Image with Image

Figure 21:
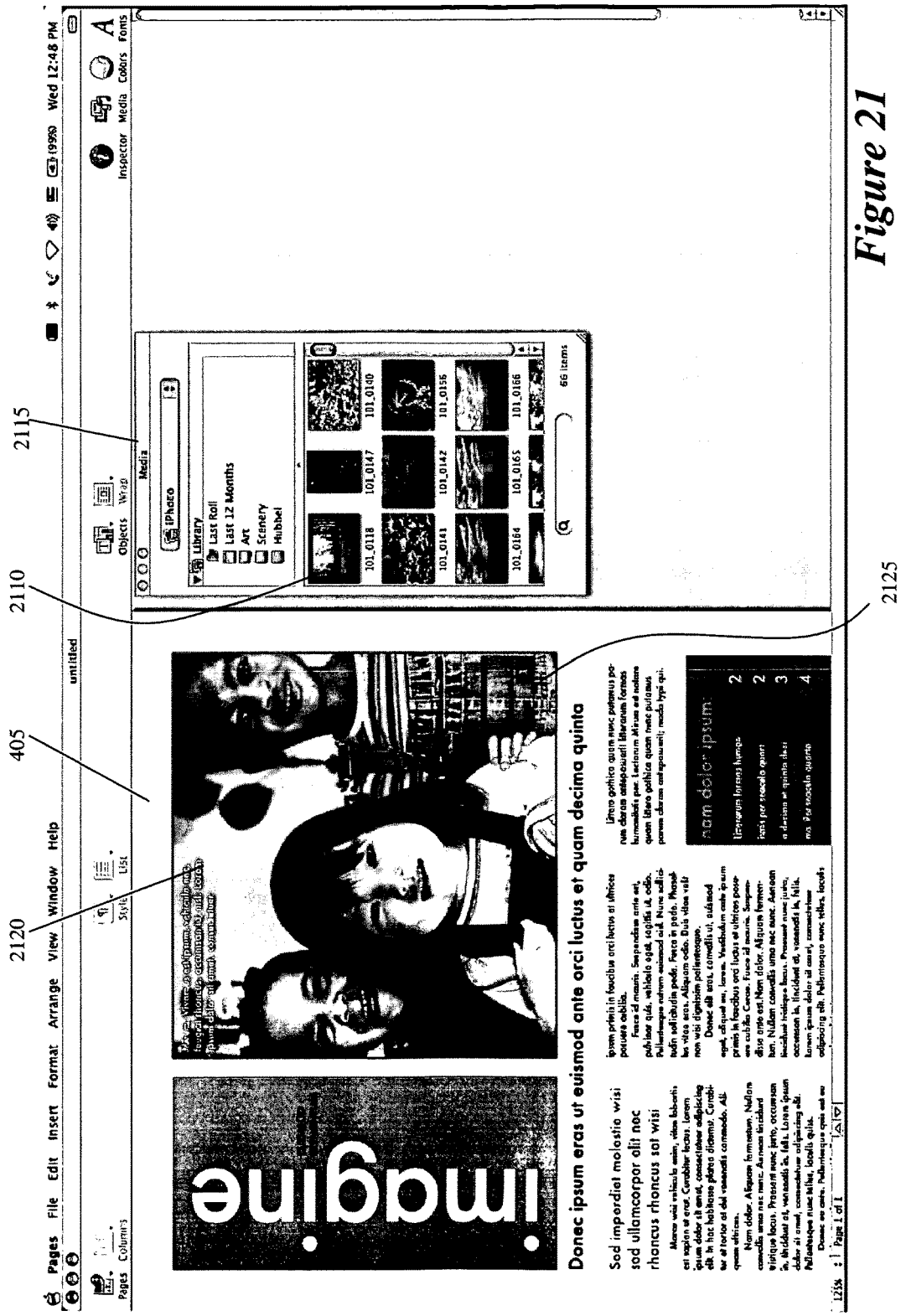
FIG. 21 illustrates a multimedia graphic selected in the media library to replace a placeholder image in a field of the page design currently being viewed for editing.
Figure 22:
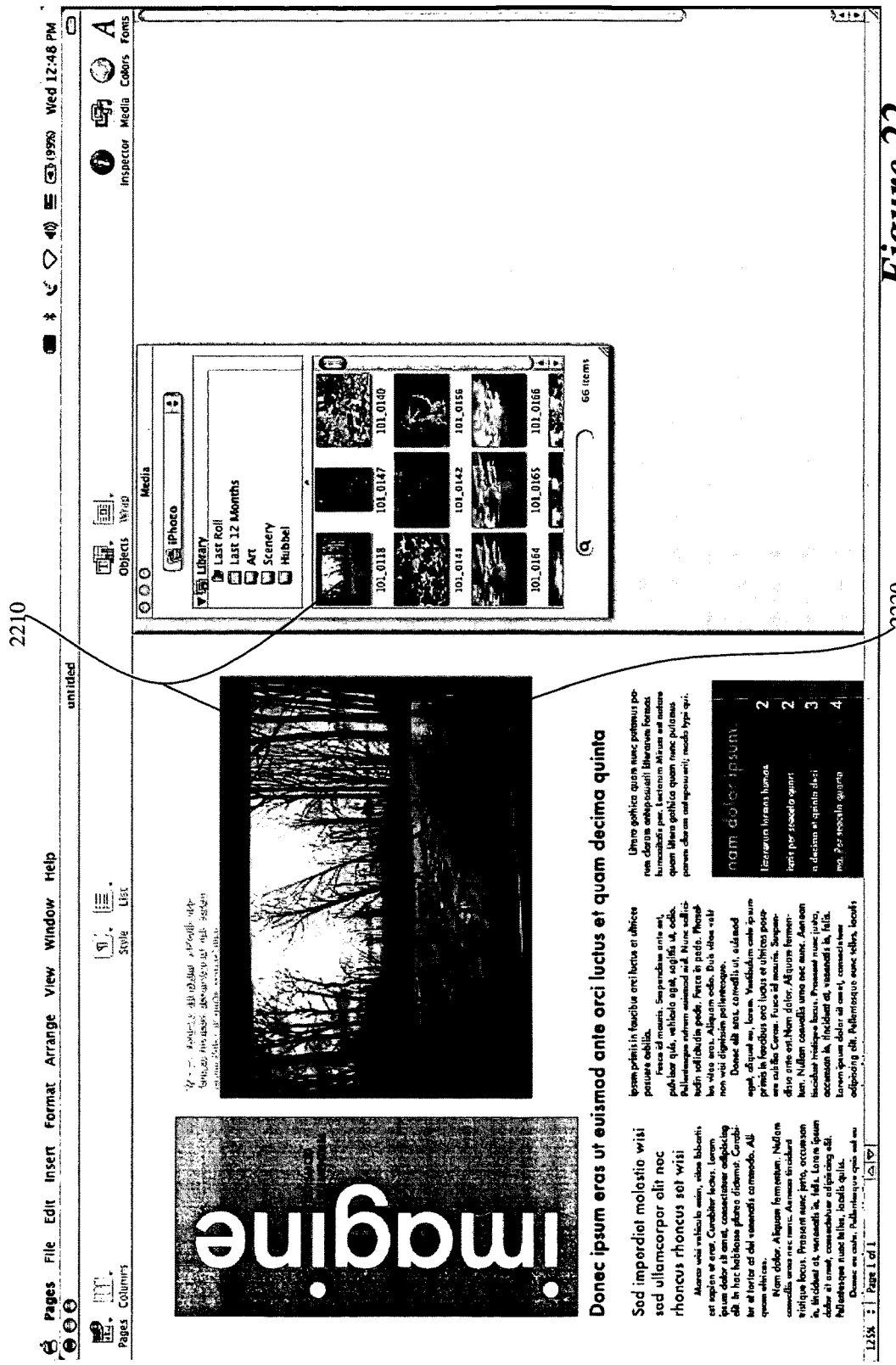
FIG. 22 illustrates the placeholder image contents of the field being replaced with content from the media library by using a single (drag-and-drop) operation.

FIGS. 21 and 22 illustrate easy drag and drop replacement of a suggested placeholder image with a user specified image from the media library. FIG. 21 illustrates the dragging of a thumbnail copy 2125 of an image 2110 in the media library 2115 to a field 2120 that displays a default image in a page. FIG. 22 then illustrates the content of the field 2220 replaced with the image 2210. Thus, some embodiments provide the ability to place and replace suggested content in a convenient one-step manner.

D. Existing Content on a Page Wrapping Around Newly Added Content: Floating Layer To allow a user to add content to a document without deleting existing content previously added or defined for the document, some embodiments allow the existing content to wrap around the newly added content. To explain this wrapping functionality, a brief description of how a document is defined is first provided below.

1. Body and Floating Layer

Some embodiments define a document by reference to body and floating layers. Content can be defined on both of these layers. Content in the body layer is placed "in line" (i.e., two pieces of content cannot overlap in the body layer) in some embodiments. In contrast, content within the floating layer can overlap with other content within the floating layer. In other words, content in the floating layer may occlude other content in this layer. Consequently, in these embodiments, adding new content or dragging existing content within the floating layer may result in overlapped content.

Content in the floating layer is not affected by content in the body of the document. Content in either the floating or body layer can be replaced with new content without affecting content in the other layer. For instance, in FIG. 4, the image 415 of the children and the box 420 are part of the floating layer while the text field 410 is part of the body layer. As shown in FIGS. 19 and 20, the replacement of the default text content in the body layer with the new image only moves the box 420 and has no effect on the image 415 in the floating layer. Similarly, as shown in FIGS. 21 and 22, the replacement of the default image 415 with the new image has no effect on the text field 410 and the box 420.

2. Content Wrapping in Real Time

Figure 23:
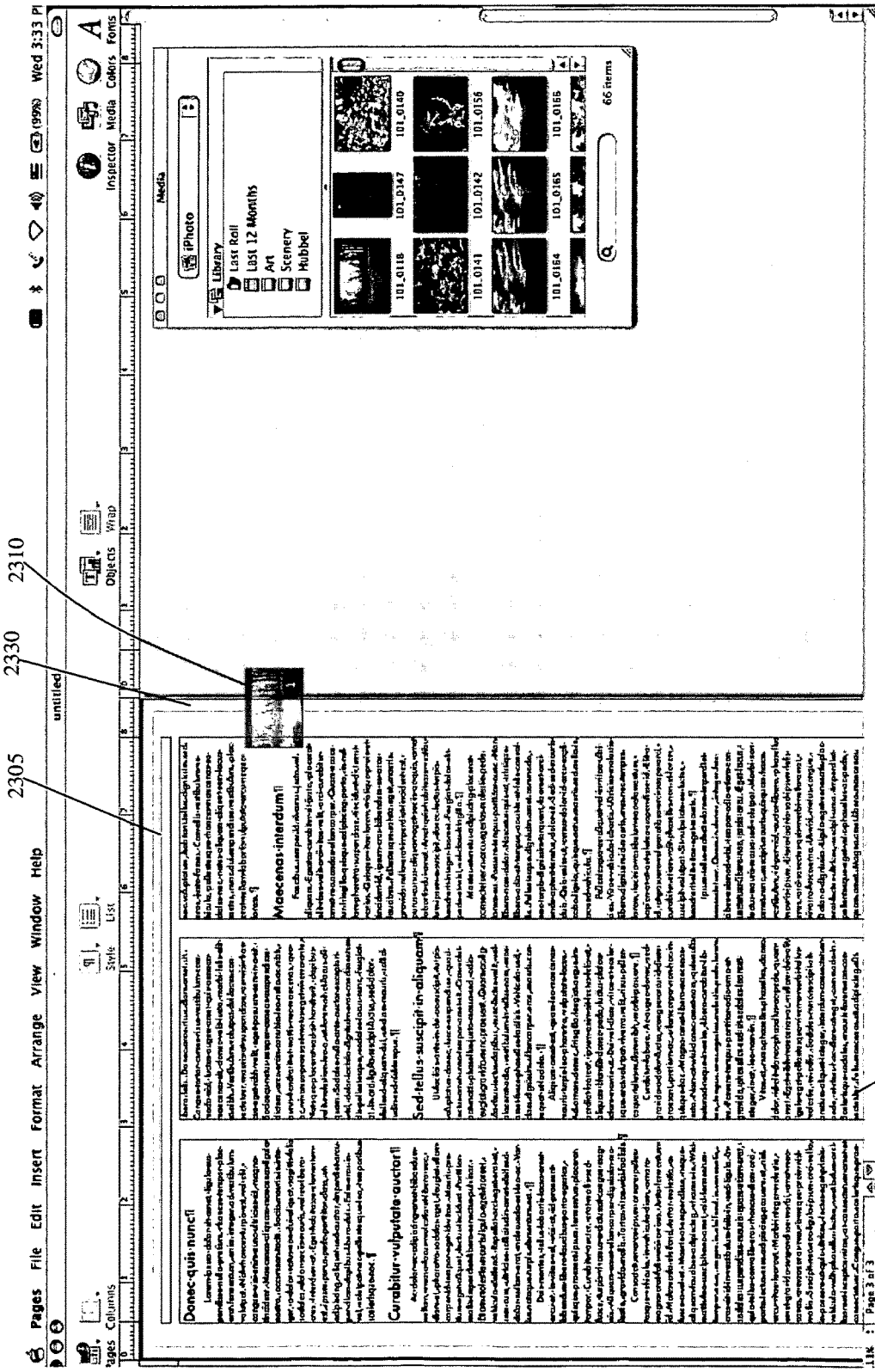
FIG. 23 illustrates an image being dragged from the media library and dropped into a floating layer of a Text Page design.

On the other hand, the body layer and contents within it might move around when content is added to the floating layer that does not replace other content in the floating layer, or existing content on the floating layer is moved around such that it now occupies locations previously assigned to the body layer. For instance, FIG. 23 illustrates an image 2310 being dropped into the floating layer of a page 2300 with a Text Page design 2305. As shown in this figure, some embodiments allow easy access to the floating layer 2330 of a document through a drag-and-drop operation on a border 2330 of the page 2300.

Figure 24:
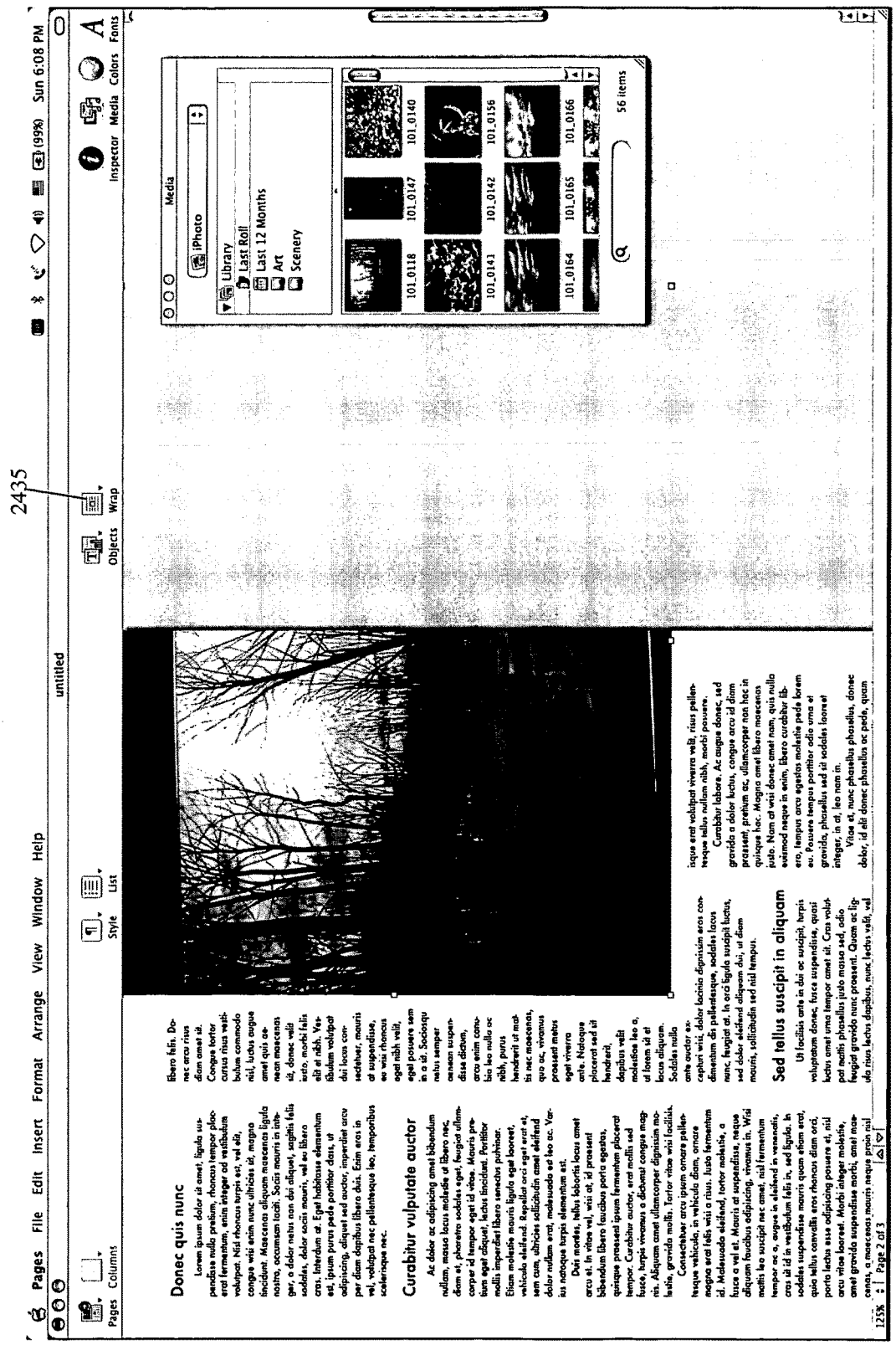
FIG. 24 illustrates the image being dragged to one region of the floating layer of the page design and the text in the body of the page design wrapping and shifting onto another Text Page design in order that the image not occlude the text.
Figure 25:
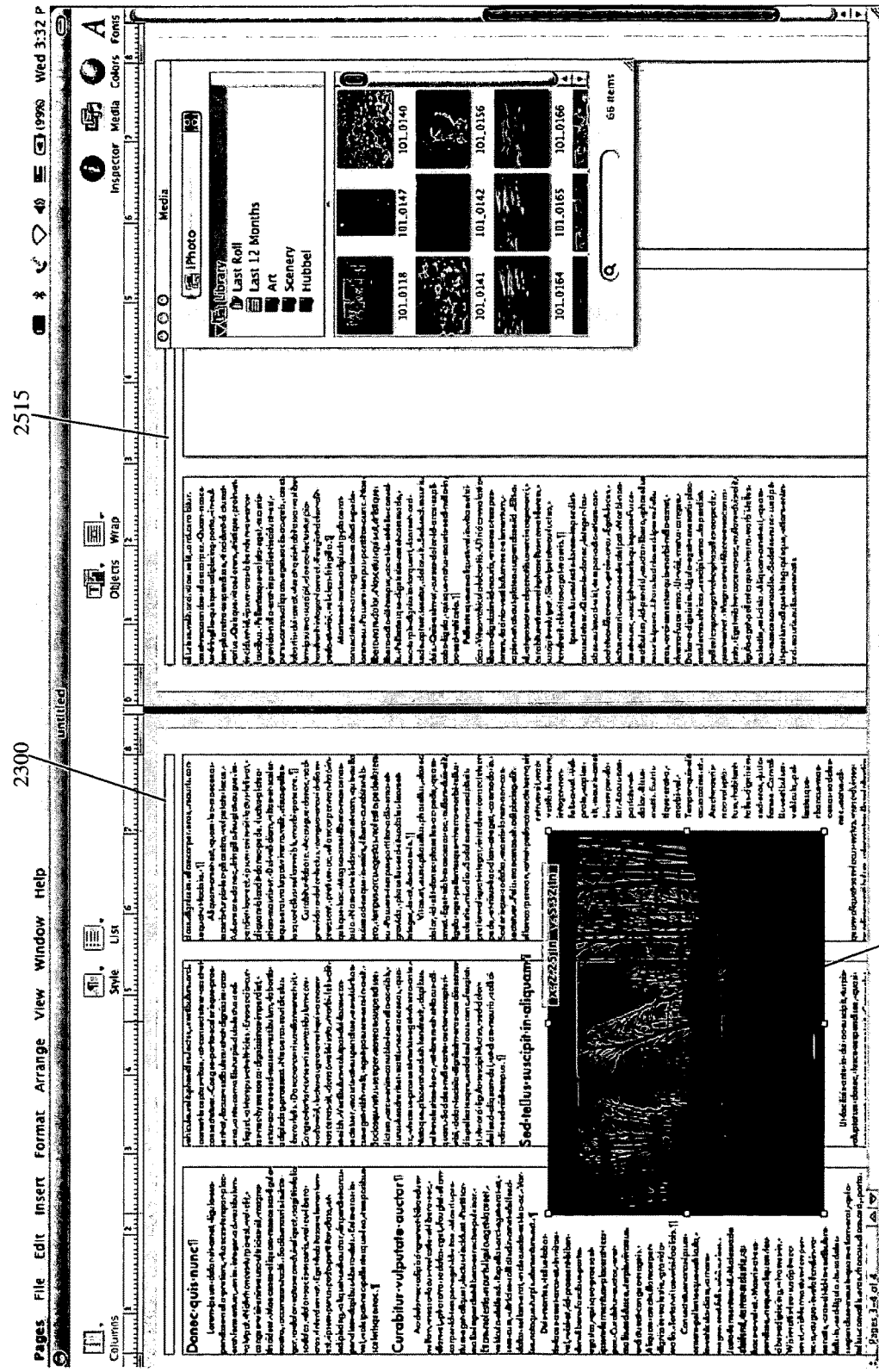
FIG. 25 illustrates the image being dragged to another region of the floating layer such that text in the body of the page design wraps and shifts in real time to compensate for the movement of the image.

FIG. 24 illustrates that when the image 2310 is dropped on the page 2300 close to its border 2330, the body layer text on this page 2300 wraps around it. FIG. 25 illustrates that the wrapping around of this text changes as the image 2310 is dragged around on the page. In some embodiments, wrapping is performed by adjusting the margins of the fields in the body when floating layer objects (i.e., content in the floating layer) are introduced into space previously assigned to these fields. In other embodiments, wrapping is performed by adjusting the margins of the body. Yet, other embodiments adjust the margins of the body and fields within the body.

Figure 26:
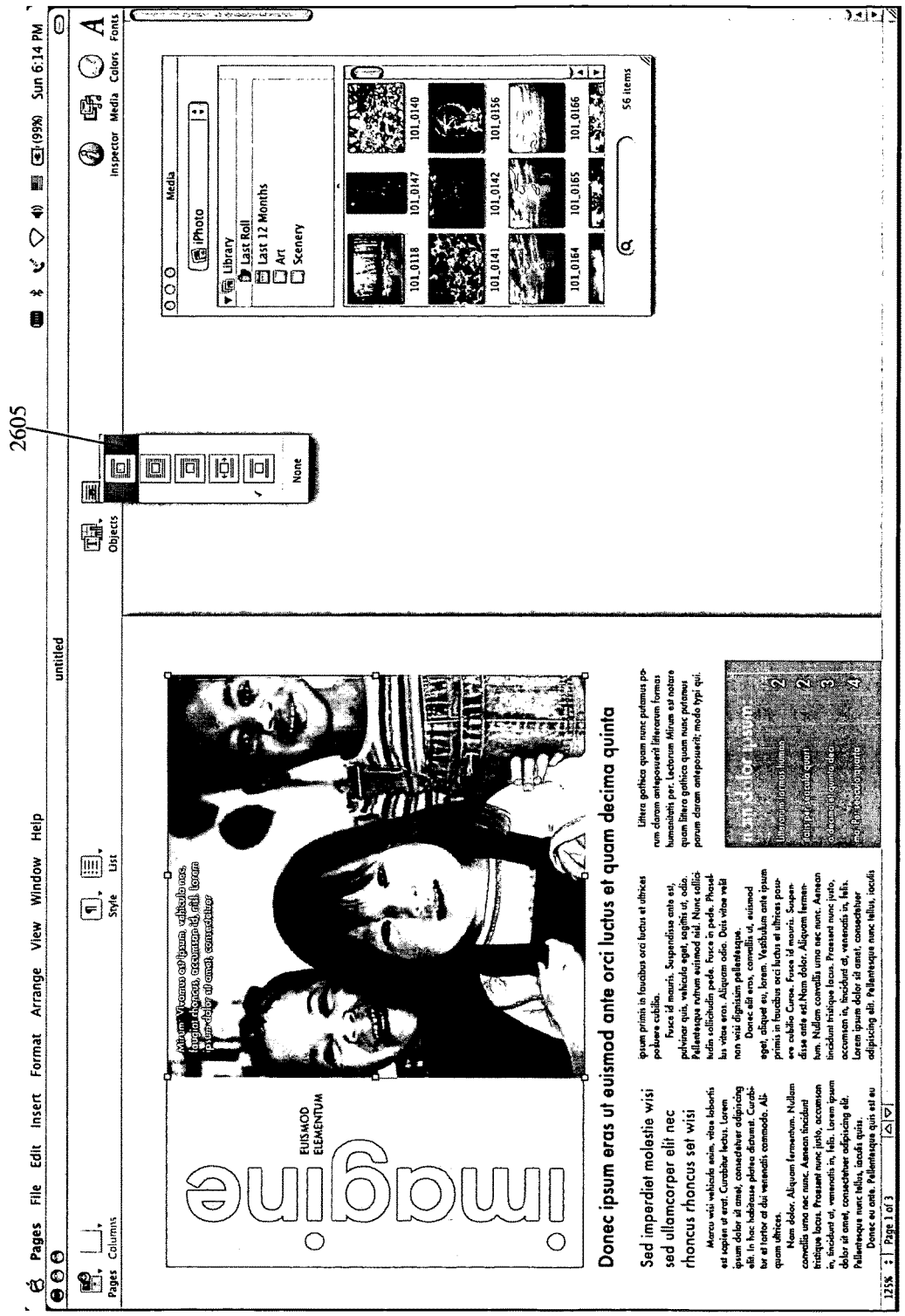
FIG. 26 illustrates a wrap menu through which a user can specify how the body should wrap around the floating layer objects.

Some embodiments further provide a user interface and tools for a user to configure the wrapping of content in a page design. In these embodiments, the tools for configuring the automated wrapping may be accessed by a wrap button 2435. When this button is selected, a dropdown menu 2605 opens up, as shown in FIG. 26. Through this menu 2605, the user can specify how the body should wrap around the floating layer objects. Specifically, as shown in FIG. 26, the menu 2605 illustrates a preview of several selections of possible wrapping styles. The preview of each wrapping style includes a representation of text and a representation of an image. The relationship between these two representations in each preview illustrates the wrapping style of the selection. For instance, the preview of the top selection in FIG. 26 illustrates text wrapping on the top, bottom, and left sides of the image, while the preview of the last selection in FIG. 26 illustrates text wrapping on only the top and bottom sides of the image.

As further shown in FIG. 25, the content in the previous example, and the wrapping in particular, are updated in real time in page design 2300 as the image 2310 is dragged around the page design 2505. Also shown in this figure, the content in the body of the page of the document may be automatically shifted to a new page 2515 in order to preserve the aesthetic view of the content. In some embodiments, the new page 2515 may carry over the formatting of the previous page 2300.

Some embodiments employ the wrapping functionality in order to maintain the readability of content in the body of a document as content is added and manipulated (e.g., moved, formatted, or removed). This feature is particularly useful for maintaining the view and aesthetics of in-line formatted content in the body of a document as content is added and manipulated in the floating layer. In some embodiments, wrapping is performed by adjusting the margins surrounding one object of content based on a border of another object.

3. Easy Access to the Floating Layer

The embodiments described above also provide an easy method of accessing the floating layer of a document. Users of other applications need to enter several menu choices and perform several clicks of the pointing device to access the floating layer of a document. Thus, manipulating content in the floating layer was a much more difficult proposition. The access and manipulation were so unintuitive that many users avoided accessing the floating layer of documents or were unaware of its existence and usability altogether. One way that the invention assists the user in identifying the floating layer is through highlighting, which will now be described.

D. Highlighting

Figure 29:
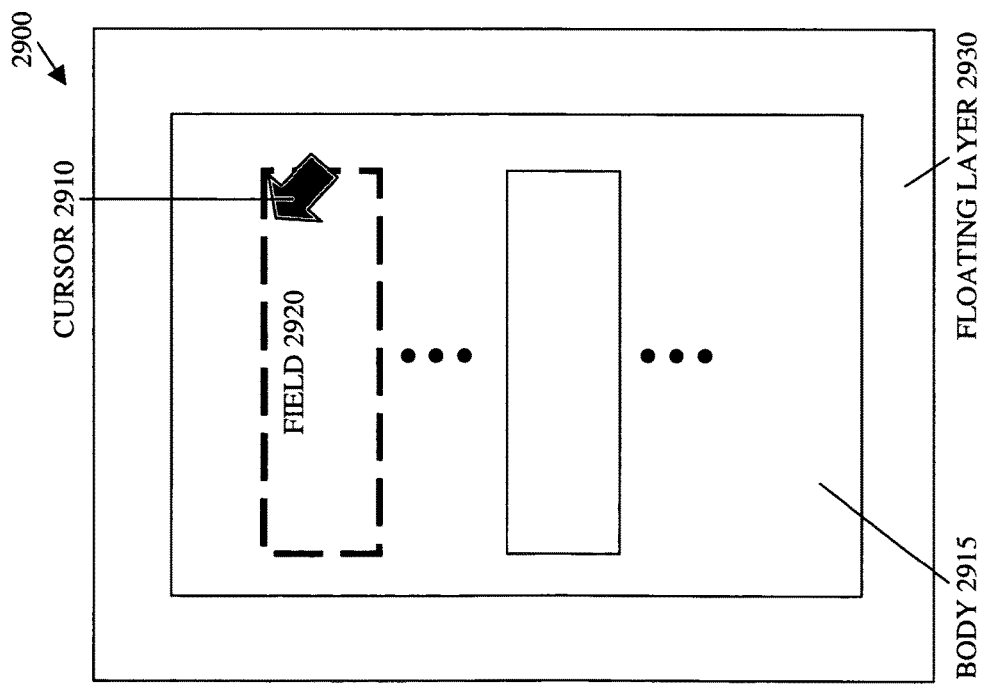
FIG. 29 illustrates highlighting the border of a field when a cursor is over a field of a document.

In order to aid a user in modifying content in the page, some embodiments provide visual cues in the form of highlighting the current element of the page being modified. This feature is particularly useful in aiding a user to distinguish the fields, body, and floating layer of the document being modified. For instance, FIGS. 27-29 show highlighting of the three elements of a document described above when each element is active for editing. These figures include a cursor, a document, a floating layer, a body, and a field in the document. Highlighting is illustrated in these figures by bold dashed lines.

Figure 30:
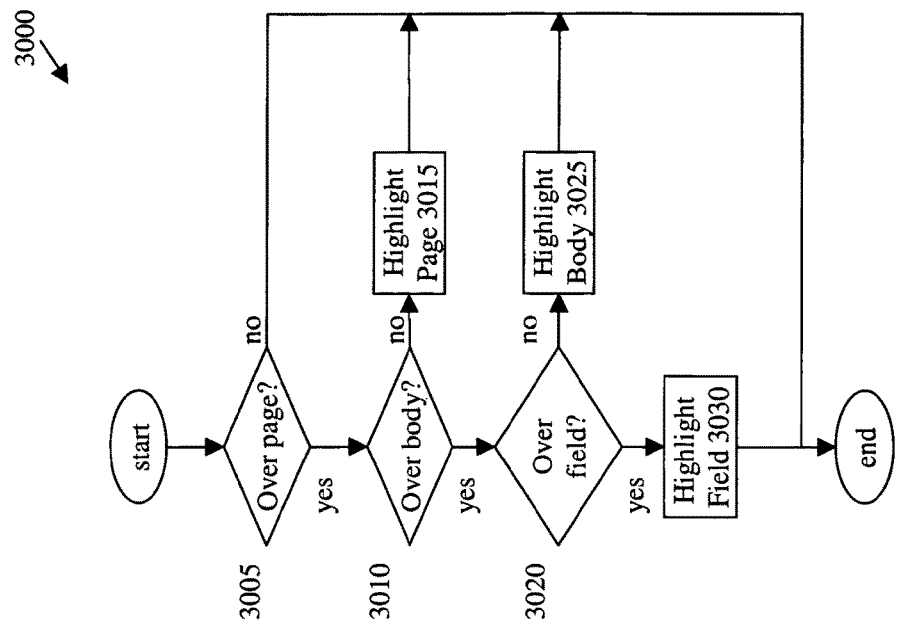
FIG. 30 is a process flow for highlighting according to some embodiments of the invention.

FIGS. 27-29 will be described by reference to a highlighting process 3000 shown in FIG. 30. The process 3000 begins by checking at 3005 whether a pointing device cursor (cursor) is over the page. In some embodiments, the checking is performed by a hit detect mechanism which polls the location coordinates under the cursor. Checking may occur only under certain conditions for some embodiments. For instance, checking may only occur when content is being dragged in some embodiments. In these embodiments, if checking occurs and if the cursor is not over a page of a document in the user interface then the process ends.

If the cursor is over a page, then the process checks at 3010 whether the cursor is over the body of the page. In some embodiments, a rectangular region within the page represents the body of the page. If the cursor is not over the body of the page, then the process highlights at step 3015 the border of the page to indicate that the floating layer is currently active or selected within the page, and then ends. In some embodiments, the process repeats so long as a condition is met such as a drag operation is being performed. FIG. 27 illustrates highlighting of a floating layer 2730 of a document 2700 when a cursor 2710 is over the floating layer 2730.

If the cursor is over the body, then the process checks at step 3020 whether the cursor is over a field. If the cursor is not over a field, then the process highlights the body at step 3025 to indicate the body is currently active within the page, and then ends. FIG. 28 illustrates highlighting of a body 2815 of a document 2800 when a cursor 2810 is over the body 2815.

If the cursor is over a field, the process highlights at step 3030 the field to indicate that the particular field is currently active within the page, and then ends. FIG. 29 illustrates highlighting of a field 2920 in a document 2900 when a cursor 2910 is over the field 2920. In some embodiments, the field highlight takes on a number of shapes that may represent an outline of the contents of the particular field.

III. Software Architecture

A. Object Diagram

Figure 31:
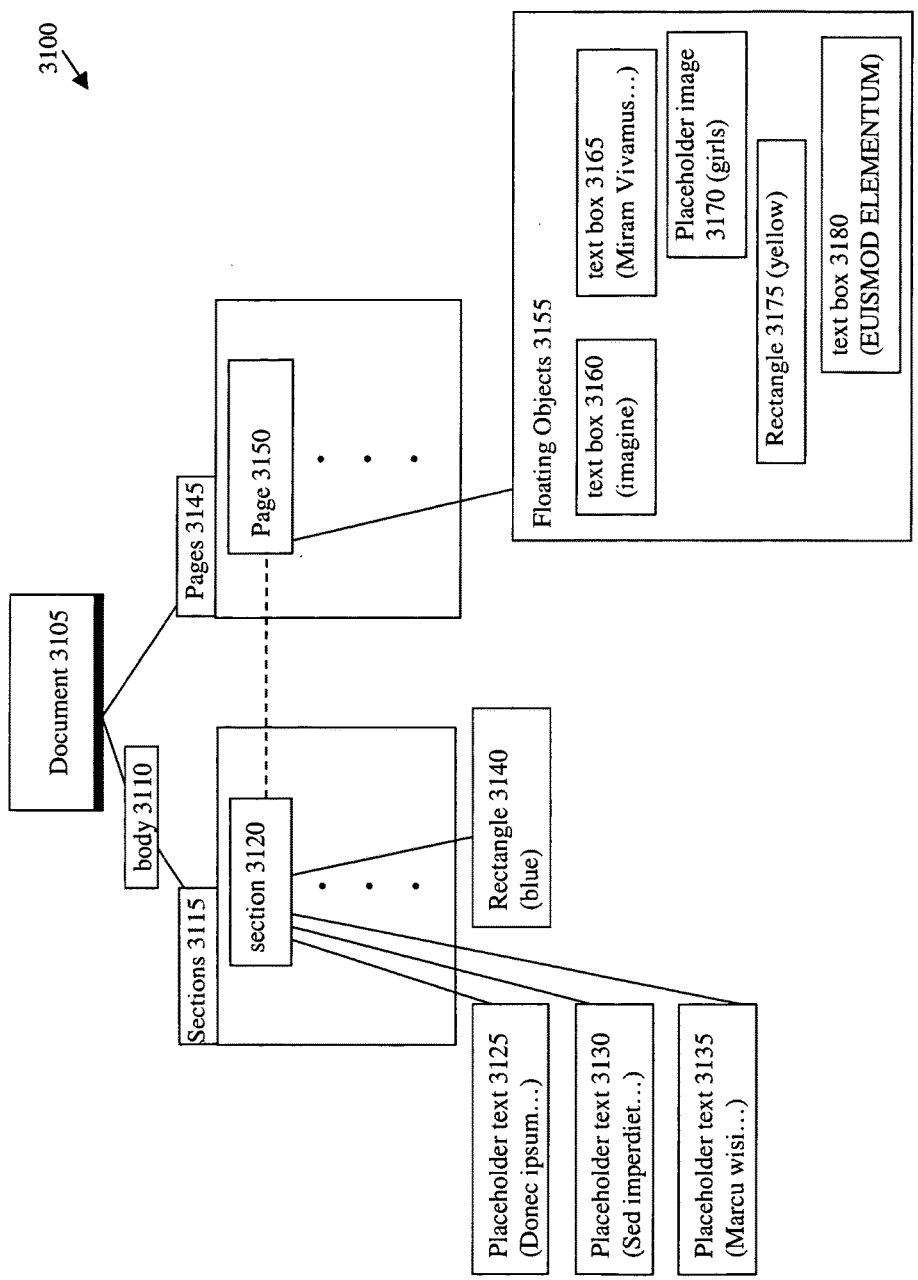
FIG. 31 is an object diagram that represents the document shown in FIG. 4.

Some embodiments implement the elements of a document described above as objects in an object-oriented software environment. FIG. 31 illustrates an object diagram 3100 for these embodiments. For instance, the object diagram 3100 represents the document shown in FIG. 4. The object diagram 3100 includes a document object 3105 that is associated with a body object 3110 and one or more pages objects 3145. Thus, content for the document 3105 may be associated with the body 3110 and/or the pages 3145.

Some embodiments define one page object for each page in a document. Thus, the pages 3145 include a page 3150, which corresponds to the single page 405 shown in FIG. 4. However, one of ordinary skill will recognize that the document 3105 might have any number of associated pages, in other embodiments.

Content in the body 3110 of some embodiments is divided into sections 3115. These sections 3115 can be used to associate content in the body to the pages 3145. For instance, the sections 3115 include a section 3120. In the embodiment shown in FIG. 31, the section 3120 is associated to the page 3150 in the document 3105. In some embodiments, the association between sections and pages can specify a one-to-one relationship. However, one of ordinary skill will recognize that in other embodiments the relationship between sections and pages could specify a ratio other than one-to-one. One of ordinary skill will also recognize that the body might have any number of associated sections in other embodiments.

Thus, content for the document 3105 may be associated, through the sections 3115, to the body 3110 and/or to the pages 3150. Some embodiments define an object for each field that can contain content in the body or the page. For instance, section 3120 has a variety of associated content objects that include placeholder objects 3125, 3130, and 3135, and a media object 3140. The placeholder objects 3125-40 are text objects, while the media object 3140 specifies an image of a blue rectangle, in the embodiment shown in FIG. 31.

The page 3150 also has a variety of associated content objects that include text objects 3160, 3165, 3180, a placeholder object 3170, and a media object 3175. In this embodiment, the text objects 3160, 3165, and 3180 specify text boxes, the placeholder object 3170 includes an image, and the media object 3175 specifies a yellow rectangle. However, in contrast to the objects associated to the body 3110, objects associated to the pages 3150 are floating objects 3155. As described in the previous section, the floating objects 3155 exist in the pages 3150 independent of objects in the body 3110 and independent of other objects in the pages 3150. In some embodiments, this feature of the floating objects 3155 is specified in a description of the floating objects 3155. In contrast, objects in the body 3110 typically have a relationship to other objects in the body 3110, such as a sequential or in-line relationship, in some embodiments. Thus, the content objects in FIG. 31 can be used to represent the content and fields described in relation to FIG. 4.

Figure 32:
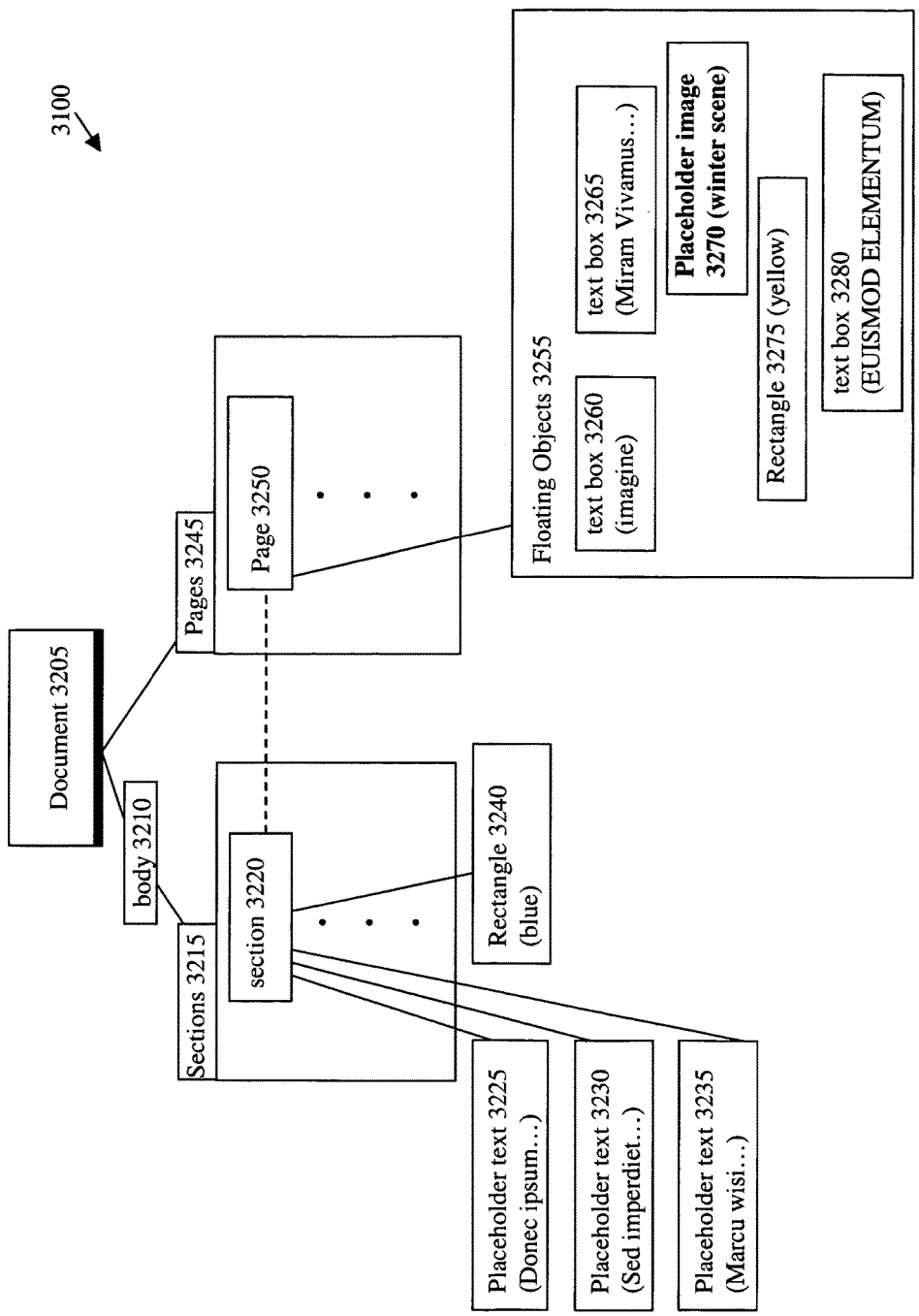
FIG. 32 is the object diagram with a placeholder object updated to reflect a new image (winter scene) that has replaced a previous image (girls).

As described in Section II, the document 3105 may be edited. For instance, FIGS. 21-22 illustrate the replacement of a placeholder image. The replacement of the placeholder image in FIGS. 21-22 will now be described by reference to FIGS. 31-32. As described above, the page 3150 has the placeholder object 3170 that includes an image (girls). FIG. 32 is the object diagram 3200 with the placeholder object 3270 updated to reflect a new image (winter scene) that has replaced the previous image (girls).

Figure 33:
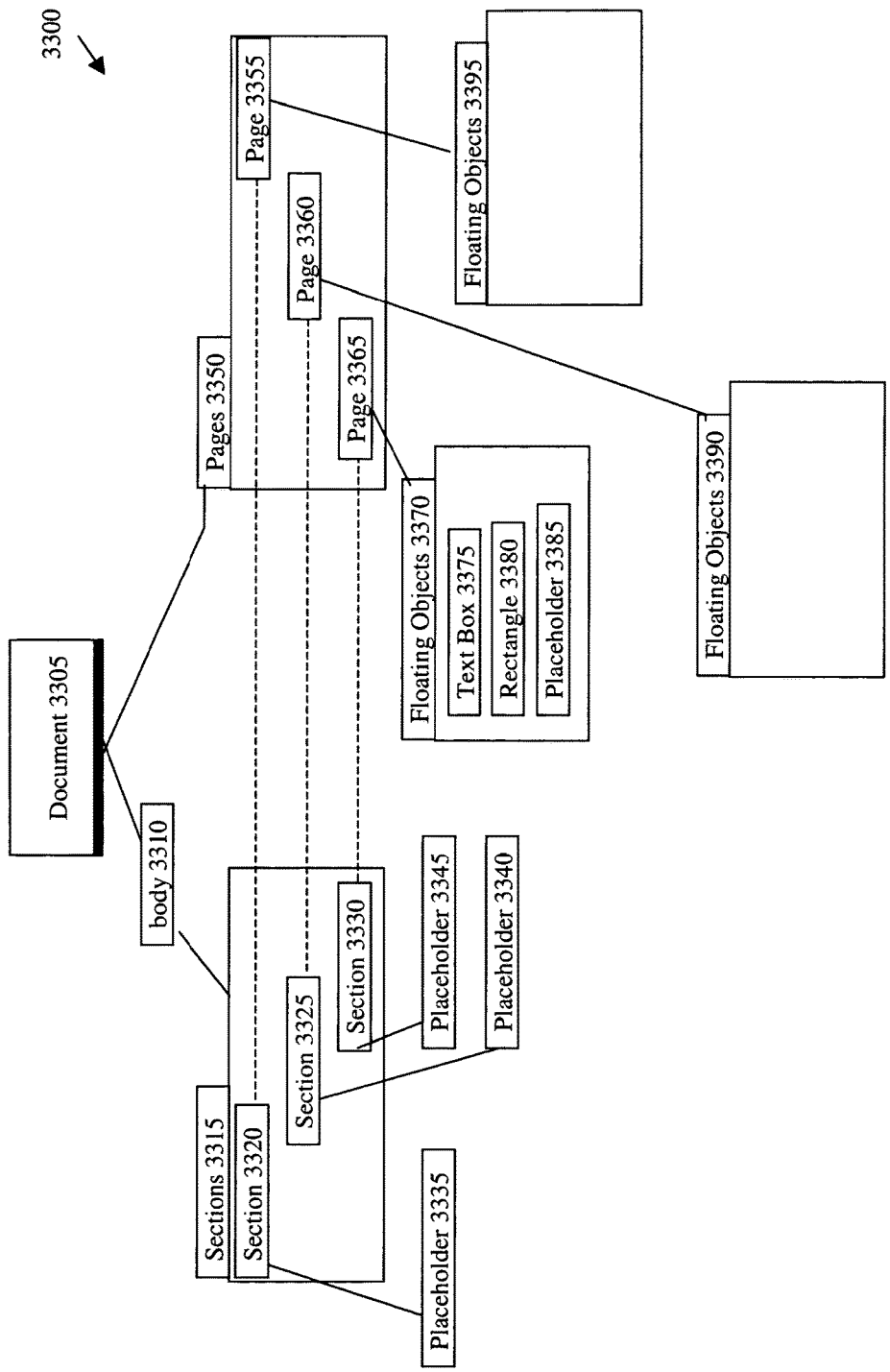
FIG. 33 is an object diagram for the three-page document illustrated in FIG. 12.

Also described in Section II, the document 3105 may be edited by the insertion of additional page designs. For instance, FIGS. 7-12 illustrate the insertion of two additional page designs after the Cover page design by using the Design Newsletter template to create a three-page template document. FIG. 33 is an object diagram 3300 for such a three-page document. The object diagram 3300 includes a document 3305 with associated pages 3355, 3360, 3365, and a body 3310. The body 3310 includes three sections 3335, 3340, 3345 that are associated to the three pages 3355, 3360, 3365, respectively. Each of these sections has various associated content objects (e.g., placeholder objects 3335, 3340, 3345).

The pages 3350 have various associated floating objects. For instance, a page 3365 has associated floating objects 3370. The floating objects 3370 include a text object 3375, a media object 3380, and a placeholder object 3385. In the embodiment shown in FIG. 33, the text object 3375 is a text box, the media object 3380 is a rectangle, and the placeholder object 3385 has an image. One of ordinary skill will recognize that these objects are merely representative. For instance, the text object 3375 may include content having various formats such as a table, or a chart. Similarly, the media object 3380 may contain various media such as an image, a sound, or a video. The placeholder object 3385 may also contain a variety of forms of content.

Thus, the FIG. 33 may be used to represent the content for the document having three page designs shown in FIG. 12. However, certain content objects related to the three-page document shown in FIG. 12 have been omitted in FIG. 33, for clarity in the description of FIG. 33.

B. File Formats

Some embodiments use description files to store a description of the objects discussed above. These embodiments may use any number of formats for description files such as the extensible markup language (XML) format. For instance, when a document is created, edited, or simply opened, some embodiments use an object representation (like the ones illustrated in FIGS. 31-33) for the document. On the other hand, when the document is closed, these embodiments convert the object representation to a description file (e.g., XML) representation.

Figure 34:
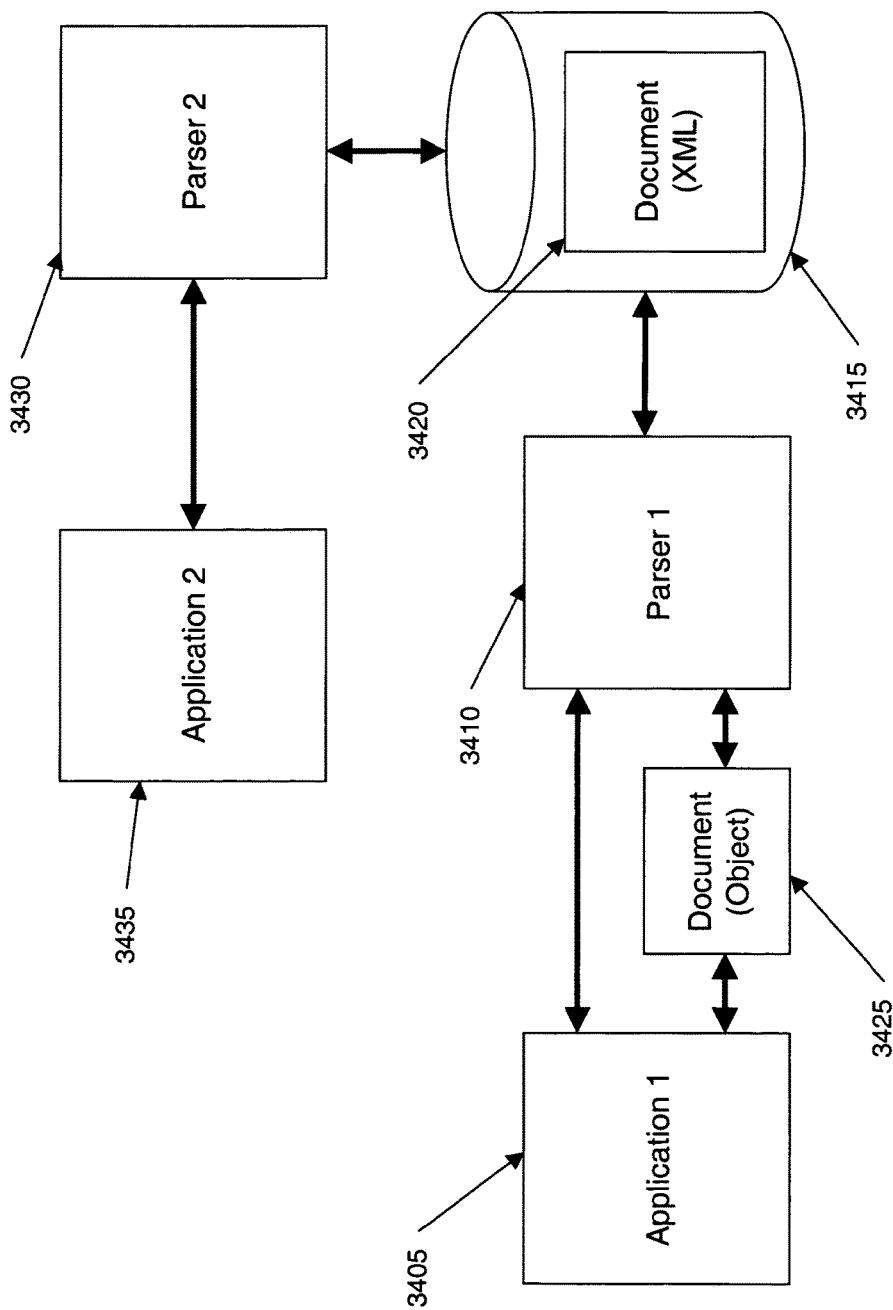
FIG. 34 illustrates an example of a word processing application having a parser retrieve an XML description of a document that is stored on a disk.

FIG. 34 illustrates one example of such an approach. Specifically, this figure illustrates the word processing application 3405 having a parser 3410 retrieve an XML description 3420 of a document that is stored on a disk 3415. As shown in this figure, the parser provides the object representation 3425 of the document to the application 3405. When the application 3405 closes the document, the application 3405 directs the parser 3410 to convert the object representation 3425 back to the XML representation.

One advantage of using description files, particularly in the XML format, is the ability to export a document that has been created by using the methods described above to other applications. These other applications might include, for example, word processing, presentation, or other document creation applications that are provided by Apple Computer, Inc., Microsoft, Inc., Adobe, Inc., etc. FIG. 34 illustrates this advantage. Specifically, this figure illustrates a second parser 3430 that opens the XML representation 3420 of the document for a second application 3435.

Figure 35:
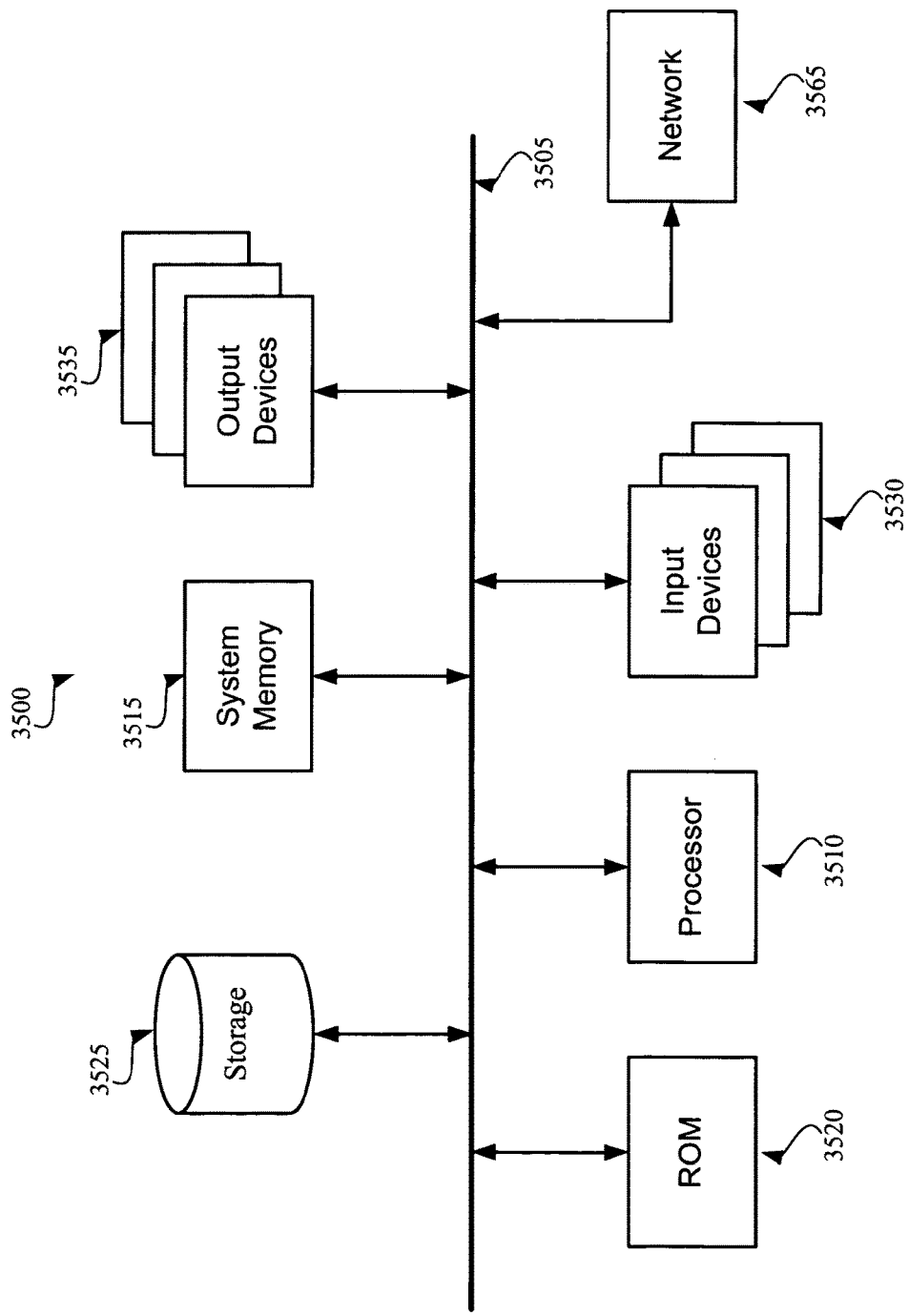
FIG. 35 presents a computer system with which some embodiments of the invention are implemented.

FIG. 35 illustrates a computer system with which some embodiments of the invention are implemented. Computer system 3500 includes a bus 3505, a processor 3510, a system memory 3515, a read-only memory 3520, a permanent storage device 3525, input devices 3530, and output devices 3535.

The bus 3505 collectively represents all system, peripheral, and chipset buses that communicatively connect the numerous internal devices of the computer system 3500. For instance, the bus 3505 communicatively connects the processor 3510 with the read-only memory 3520, the system memory 3515, and the permanent storage device 3525.

From these various memory units, the processor 3510 retrieves instructions to execute and data to process in order to execute the processes of the invention. The read-only-memory (ROM) 3520 stores static data and instructions that are needed by the processor 3510 and other modules of the computer system.

The permanent storage device 3525, on the other hand, is a read-and-write memory device. This device is a non-volatile memory unit that stores instructions and data even when the computer system 3500 is off. Some embodiments of the invention use a mass-storage device (such as a magnetic or optical disk and its corresponding disk drive) as the permanent storage device 3525.

Other embodiments use a removable storage device (such as a floppy disk or ZIP® disk, and its corresponding disk drive) as the permanent storage device. Like the permanent storage device 3525, the system memory 3515 is a read-and-write memory device. However, unlike storage device 3525, the system memory is a volatile read-and-write memory, such a random access memory. The system memory stores some of the instructions and data that the processor needs at runtime. In some embodiments, the invention's processes are stored in the system memory 3515, the permanent storage device 3525, and/or the read-only memory 3520.

The bus 3505 also connects to the input and output devices 3530 and 3535. The input devices enable the user to communicate information and select commands to the computer system. The input devices 3530 include alphanumeric keyboards and pointing devices. The output devices 3535 display images generated by the computer system. For instance, these devices display a graphical user interface. The output devices include printers and display devices, such as cathode ray tubes (CRT) or liquid crystal displays (LCD).

Finally, as shown in FIG. 35, bus 3505 also couples computer 3500 to a network 3565 through a network adapter (not shown). In this manner, the computer can be a part of a network of computers (such as a local area network ("LAN"), a wide area network ("WAN"), or an Intranet, or a network of networks, such as the internet. For example, the computer 3500 may be coupled to a web server (network 3565) so that a web browser executing on the computer 3500 can interact with the web server as a user interacts with a graphical user interface that operates in the web browser.

Any or all components of computer system 3500 may be used in conjunction with the invention. However, one of ordinary skill in the art would appreciate that any other system configuration may also be used in conjunction with the present invention.

The invention provides users with the ability to quickly create complex documents by providing them with numerous templates that can be custom configured to suit the users' particular needs. In addition, the invention provides an intuitive set of tools to allow the user to custom configure the templates. Moreover, the invention provides numerous visual cues that simplify the process of editing a template.

As mentioned above, some embodiments use description files to store descriptions of the elements (e.g., page designs, fields, content, etc.) of the templates and documents described above. These embodiments might use any number of formats such as a Document-Type-Definition (DTD) format or a Schema format. The Schema formats of some embodiments are shown in greater detail in the appendix (the 247 kilobyte appendix.txt), created and uploaded to EFS-Web on Aug. 2, 2017, which is incorporated by reference.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A non-transitory computer readable medium storing a computer program which when executed by at least one processor selects content in a document, the computer program comprising sets of instructions for:
    displaying a page of the document, the page comprising at least one field that displays stored content, wherein the at least one field is initially populated with placeholder content that is replaceable with user-generated content;
    receiving, at the document, a selection of a portion of the content of a particular field of the displayed page, the selected portion less than the entirety of the content of the particular field, wherein the selected portion is based on a click operation within the particular field that contains either the placeholder content or the user-generated content; and
    in response to receiving the selection:
        determining whether the particular field contains the placeholder content or the user-generated content;
        when the particular field contains the placeholder content: automatically selecting within the particular field all of the placeholder content of the particular field of the displayed page; and
        when the particular field contains the user-generated content: selecting within the particular field only the portion of the content of the particular field.

2. The non-transitory computer readable medium of claim 1, wherein the content of the particular field is text content comprising a set of characters, wherein the selected portion of the content comprises a subset of the set of characters.

3. The non-transitory computer readable medium of claim 2, wherein the entire set of characters of the text content in the particular field is automatically selected when the subset of characters of the selected portion of the content is received, and the subset of characters comprises the placeholder content.

4. The non-transitory computer readable medium of claim 1, wherein the set of instructions for automatically selecting within the particular field all of the placeholder content comprises a set of instructions for expanding the selected portion of the content to include all of the content in the particular field.

5. The non-transitory computer readable medium of claim 1, wherein the set of instructions for automatically selecting within the particular field all of the placeholder content comprises a set of instructions for highlighting all of the content of the particular field.

6. The non-transitory computer readable medium of claim 1, wherein the computer program further comprises sets of instructions for:
    replacing, in response to a first operation that provides other content for the particular field, the entire content of the particular field with the content provided by the first operation;
    receiving a selection of a portion of user-generated content of a second different field of the displayed page; and
    replacing, in response to a second operation that provides other content for the second field, the selected portion of the user-generated content with the content provided by the second operation, wherein the content of the second field that is not the selected portion of content is not replaced.

7. The non-transitory computer readable medium of claim 1, wherein the placeholder content comprises font and formatting that depicts an expected appearance of the user-generated content upon replacing the placeholder content with the user-generated content.

8. A non-transitory computer readable medium storing a computer program which when executed by at least one processor selects content in a document created from a template comprising a set of template pages preconfigured with fields and placeholder content, the computer program comprising sets of instructions for:
    displaying a page of the document based on one of the preconfigured template pages of the template used to create the document, said page comprising a field storing template-based placeholder content or storing user-generated content, wherein the preconfigured template pages are initially populated with the placeholder content that is replaceable with the user-generated content;
    receiving, at the document, a selection of a portion of the content, wherein the selection is based on a click operation within the field of either the placeholder content or user-generated content; and
    in response to receiving, at the document, the selection:
        determining whether the field contains the placeholder content or the user-generated content;
        when the field contains the placeholder content: automatically selecting within the field all of the placeholder content of the field when the selection comprises clicking on the placeholder content of the field; and
        when the field contains the user-generated content: selecting within the field only the portion of the user-generated content of the field.

9. The non-transitory computer readable medium of claim 8, wherein the computer program further comprises sets of instructions for replacing, in response to an operation that provides other content for inserting in the page, the selected content of the field with the other provided content.

10. The non-transitory computer readable medium of claim 9, wherein the set of instructions for replacing the selected content comprises sets of instructions for:
    deleting the selected content of the field; and
    inserting the other content in place of the deleted content in the field.

11. The non-transitory computer readable medium of claim 9, wherein the other content that replaces the selected content is user-generated content.

12. The non-transitory computer readable medium of claim 9, wherein the other content that replaces the selected content is media content.

13. The non-transitory computer readable medium of claim 12, wherein the media content is provided from a media library.

14. The non-transitory computer readable medium of claim 12, wherein the operation that provides the media content is an operation that drags the media content from a second field of the page.

15. The non-transitory computer readable medium of claim 8, wherein the template-based placeholder content of the field is default text content.

16. The non-transitory computer readable medium of claim 8, wherein the user-generated content of the field is previously-inserted text content that replaced template-based placeholder text content.

17. A method for defining a template document for use by a user to create a document by adding content to the template document, the method comprising:

defining a set of default pages of the template document, each page for populating the template document with content; and defining placeholder content that initially populates each page, the placeholder content replaceable by user-generated content; and defining at least one field of a particular page of the template document, each field of the at least one field initially comprising placeholder content that is replaceable by user-generated content, wherein:

in response to a selection of content of a respective field of the at least one field comprising a click operation on the content within the respective field of the template document:

determining whether the content comprises the placeholder content or the user-generated content;

when the content comprises the placeholder content: automatically selecting the entirety of the placeholder content of the respective field; and when the content comprises the user-generated content: automatically selecting only a portion of the user-generated content.

18. The method of claim 17, wherein the placeholder content of the respective field is text content comprising a set of characters, wherein the selection of the portion of the placeholder content within the respective field is a selection of a subset of the characters in the set of characters.

19. The method of claim 17, wherein the placeholder content of the respective field is text placeholder content that is replaceable by user-generated media content.

20. The method of claim 19, wherein defining the at least one field of the particular page comprises defining a layout size of each field, wherein the layout size of the each field is adjusted to accommodate a size of the user-generated media content.

21. The method of claim 17, wherein the entirety of the placeholder content is highlighted when the entirety of the placeholder content is automatically selected.

\* \* \* \* \*